(12) United States Patent
Masuda

(10) Patent No.: US 12,366,658 B2
(45) Date of Patent: *Jul. 22, 2025

(54) DISTANCE MEASUREMENT DEVICE, DERIVING METHOD FOR DISTANCE MEASUREMENT, AND DERIVING PROGRAM FOR DISTANCE MEASUREMENT

(71) Applicant: FUJIFILM CORPORATION, Tokyo (JP)

(72) Inventor: Tomonori Masuda, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,340

(22) Filed: Oct. 18, 2023

(65) Prior Publication Data

US 2024/0045059 A1    Feb. 8, 2024

Related U.S. Application Data

(63) Continuation of application No. 16/944,674, filed on Jul. 31, 2020, now Pat. No. 11,828,847, which is a
(Continued)

(30) Foreign Application Priority Data

Aug. 31, 2015  (JP) .................. 2015-171419

(51) Int. Cl.
*G01C 3/08* (2006.01)
*G01S 7/481* (2006.01)
(Continued)

(52) U.S. Cl.
CPC ............... *G01S 17/08* (2013.01); *G01C 3/08* (2013.01); *G01S 7/481* (2013.01); *G01S 7/497* (2013.01); *G01S 17/86* (2020.01)

(58) Field of Classification Search
CPC .......... G01S 17/08; G01S 17/86; G01S 7/481; G01S 7/497; G01C 3/08
See application file for complete search history.

(56) References Cited

U.S. PATENT DOCUMENTS 5,673,082 A  9/1997  Wells et al.
6,704,099 B2  3/2004  Uomori et al.
(Continued)

FOREIGN PATENT DOCUMENTS

JP  H06-147844 A  5/1994
JP  2004-205222 A  7/2004
(Continued)

OTHER PUBLICATIONS

International Search Report issued in International Application No. PCT/JP2016/063580 on Jul. 12, 2016.
(Continued)

*Primary Examiner* — Mark Hellner
(74) *Attorney, Agent, or Firm* — SOLARIS Intellectual Property Group, PLLC

(57) ABSTRACT

A distance measurement device includes an imaging unit, a measurement unit that measures a distance to a subject by emitting directional light which is light having directivity to the subject and receiving reflection light of the directional light, and a deriving unit that acquires a correspondence relation between an in-provisional-image irradiation position, which corresponds to an irradiation position of the directional light onto the subject, within a provisional image acquired by provisionally imaging the subject by the imaging unit whenever each of a plurality of distances is provisionally measured by the measurement unit and a distance which is provisionally measured by the measurement unit by using the directional light corresponding to the in-provisional-image irradiation position, and derives an in-actual-image irradiation position, within an actual image acquired
(Continued)

by performing actual imaging by the imaging unit, based on the acquired correspondence relation.

19 Claims, 17 Drawing Sheets

Related U.S. Application Data continuation of application No. 15/904,453, filed on Feb. 26, 2018, now Pat. No. 10,802,143, which is a continuation of application No. PCT/JP2016/063580, filed on May 2, 2016.

(51) Int. Cl.
*G01S 7/497* (2006.01)
*G01S 17/08* (2006.01)
*G01S 17/86* (2020.01)

(56) References Cited

U.S. PATENT DOCUMENTS

| | | | |
|---|---|---|---|
| 9,569,859 B2* | 2/2017 | Michaelraj | G06T 11/60 |
| 10,070,038 B2 | 9/2018 | Komatsu | |
| 10,802,143 B2 | 10/2020 | Masuda | |
| 2006/0290781 A1 | 12/2006 | Hama | |
| 2007/0168153 A1 | 7/2007 | Minor et al. | |
| 2014/0376005 A1 | 12/2014 | Aoki | |
| 2015/0309174 A1 | 10/2015 | Giger | |
| 2018/0059245 A1* | 3/2018 | Meinherz | G01S 17/894 |

FOREIGN PATENT DOCUMENTS

| | | |
|---|---|---|
| JP | 2007-010346 A | 1/2007 |
| JP | 2013-113809 A | 6/2013 |
| JP | 2014-232095 A | 12/2014 |
| WO | 2013145164 A1 | 10/2013 |

OTHER PUBLICATIONS

Written Opinion of the ISA issued in International Application No. PCT/JP2016/063580 on Jul. 12, 2016.
Written Opinion of the IPEA issued in International Application No. PCT/JP2016/063580 on Oct. 11, 2016.
International Preliminary Report on Patentability issued in International Application No. PCT/JP2016/063580 on Dec. 1, 2016.
English language translation of the following: Office action dated Aug. 21, 2018 from the JPOA in a Japanese patent application No. 2017-537574 corresponding to the instant patent application.
Non-Final Office Action issued by USPTO on Feb. 27, 2020, in related U.S. Appl. No. 15/904,453.
Notice of Allowance issued by USPTO on Jun. 10, 2020, in related U.S. Appl. No. 15/904,453.
Non-Final Office Action issued by USPTO on Apr. 20, 2023, in related U.S. Appl. No. 16/944,674.
Notice of Allowance issued by USPTO on Jul. 26, 2023, in related U.S. Appl. No. 16/944,674.

* cited by examiner

FIG. 11

| PARAMETER CHANGING FACTOR | CORRESPONDENCE INFORMATION ~98 ||
| --- | --- | --- |
| | IN-PROVISIONAL-IMAGE IRRADIATION POSITION | DISTANCE |
| CHANGE IN ANGLE OF VIEW (1) | $X_1$ | $D_1$ |
| | $X_2$ | $D_2$ |
| | $X_3$ | $D_3$ |
| CHANGE IN ANGLE OF VIEW (2) | $X_4$ | $D_4$ |
| | $X_5$ | $D_5$ |
| | $X_6$ | $D_6$ |
| CHANGE IN ANGLE OF VIEW (3) | $X_7$ | $D_7$ |
| | $X_8$ | $D_8$ |
| | $X_9$ | $D_9$ |
| REPLACEMENT OF LENS (1) | $X_{10}$ | $D_{10}$ |
| | $X_{11}$ | $D_{11}$ |
| | $X_{12}$ | $D_{12}$ |
| REPLACEMENT OF LENS (2) | $X_{13}$ | $D_{13}$ |
| | $X_{14}$ | $D_{14}$ |
| | $X_{15}$ | $D_{15}$ |
| REPLACEMENT OF DISTANCE MEASUREMENT UNIT (1) | $X_{16}$ | $D_{16}$ |
| | $X_{17}$ | $D_{17}$ |
| | $X_{18}$ | $D_{18}$ |
| REPLACEMENT OF DISTANCE MEASUREMENT UNIT (2) | $X_{19}$ | $D_{19}$ |
| | $X_{20}$ | $D_{20}$ |
| | $X_{21}$ | $D_{21}$ |
| CHANGE IN EMISSION DIRECTION (1) | $X_{22}$ | $D_{22}$ |
| | $X_{23}$ | $D_{23}$ |
| | $X_{24}$ | $D_{24}$ |
| CHANGE IN EMISSION DIRECTION (2) | $X_{25}$ | $D_{25}$ |
| | $X_{26}$ | $D_{26}$ |
| | $X_{27}$ | $D_{27}$ |
| CHANGE IN EMISSION DIRECTION (3) | $X_{28}$ | $D_{28}$ |
| | $X_{29}$ | $D_{29}$ |
| | $X_{30}$ | $D_{30}$ |
| ⋮ | ⋮ | ⋮ |

FIG. 14

PLEASE, PERFORM PROVISIONAL MEASUREMENT AND PROVISIONAL IMAGING THREE TIMES WHILE CHANGING EMISSION DIRECTION OF LASER BEAM ~112

FIG. 15

EFFECTIVE DISTANCES ARE NOT ABLE TO BE MEASURED.
PLEASE, PERFORM PROVISIONAL MEASUREMENT AND PROVISIONAL IMAGING THREE TIMES WHILE CHANGING EMISSION DIRECTION OF LASER BEAM ~114

FIG. 16

DO YOU WANT TO INCREASE THE ACCURACY OF THE IRRADIATION POSITION MARK? ~118

YES   NO

DISTANCE MEASUREMENT DEVICE, DERIVING METHOD FOR DISTANCE MEASUREMENT, AND DERIVING PROGRAM FOR DISTANCE MEASUREMENT

CROSS-REFERENCE TO RELATED APPLICATION

The application is a continuation application of, and claims priority to U.S. application Ser. No. 16/944,674, filed Jul. 31, 2020, which is a continuation application of, and claims priority to, U.S. application Ser. No. 15/904,453, filed Feb. 26, 2018, which is a continuation application of, and claims priority to, International Application No. PCT/JP2016/063580, filed May 2, 2016. Further, this application claims priority from Japanese Patent Application No. 2015-171419 filed Aug. 31, 2015. The disclosures of all applications noted above are incorporated herein by reference in their entireties.

BACKGROUND OF THE INVENTION

1. Field of the Invention

A technology of the present disclosure relates to a distance measurement device, a deriving method for distance measurement, and a deriving program for distance measurement.

2. Description of the Related Art

Initially, in the present specification, distance measurement means that a distance to a subject which is a measurement target from a distance measurement device is measured. In the present specification, a captured image means an image acquired by imaging the subject by an imaging unit that images the subject. In the present specification, irradiation-position pixel coordinates mean two-dimensional coordinates as two-dimensional coordinates for specifying a position of a pixel, among pixels included in the captured image, which corresponds to an irradiation position of directional light in a real space by the distance measurement device on the assumption that distance measurement is performed by using the distance measurement device that performs the distance measurement based on a time during which the directional light (for example, laser beam) emitted by an emission unit toward the subject supposed to be a distance measurement target travels in a reciprocating motion. In the present specification, an in-image irradiation position means a position acquired as a position within the captured image, which corresponds to the irradiation position of the directional light in the real space by the distance measurement device. In other words, the in-image irradiation position means a position of a pixel, among the pixels included in the captured image, which is specified by the irradiation-position pixel coordinates.

In recent years, a distance measurement device provided with an imaging unit has been developed. In such a type of distance measurement device, a subject is irradiated with a laser beam, and the subject is captured in a state in which the subject is irradiated with the laser beam. The captured image acquired by imaging the subject is presented to a user, and thus, an irradiation position of the laser beam is ascertained by the user through the captured image.

In recent years, a distance measurement device having a function of deriving a dimension of a target within an image in a real space as in a measurement device described in JP2014-232095A has been also developed.

The measurement device described in JP2014-232095A includes a unit that displays an isosceles trapezoid shape of a structure having an isosceles trapezoid portion captured by the imaging unit and a unit that specifies four vertices of the displayed isosceles trapezoid shape and acquiring coordinates of the four specified vertices. The measurement device described in JP2014-232095A specifies a distance between two points on a plane including the isosceles trapezoid shape or a distance to one point on a plane from the imaging unit, acquires a shape of the structure from the coordinates of the four vertices and a focal length, and acquires a size of the structure from the specified distance.

Incidentally, in a case where a dimension of a target within the captured image acquired by imaging the subject by the imaging unit is derived, a plurality of pixels corresponding to a region as a deriving target in the captured image in the real space is designated by the user. The dimension of the region in the real space which is designated by the user is derived based on the distance measured by the distance measurement device. Thus, in a case where the dimension of the region in the real space specified by the plurality of designated pixels is accurately derived, it is preferable that the in-image irradiation position is derived with high accuracy and the acquired in-image irradiation position together with the distance is ascertained by the user.

SUMMARY OF THE INVENTION

However, P2014-232095A does not describe a unit that derives the in-image irradiation position with high accuracy.

The user designates a region as the dimension deriving target by referring to the in-image irradiation position, but the derived dimension is completely different from an actual dimension in a case where the in-image irradiation position and the irradiation position of the laser beam in the real space are positions on planes of which orientations and positions are different.

In a case where a colored laser beam of which an irradiation position is able to be visually perceived within a distance of about several meters from the distance measurement device is used as the laser beam, the in-image irradiation position may be visually specified and designated from the captured image depending on a diameter and/or intensity of the laser beam. However, for example, in a case where a structure separated from a building site by several tens of meters or several hundreds of meters is irradiated with the laser beam in the daytime, it is difficult to visually specify the in-image irradiation position from the captured image. A method of specifying the in-image irradiation position from a difference between the plurality of captured images acquired in a sequence of time is also considered. However, in a case where the structure separated from the building site by several tens of meters or several hundreds of meters is irradiated with the laser beam, it is difficult to specify the in-image irradiation position.

The embodiment of the present invention has been made in view of such circumstances, and provides a distance measurement device, a deriving method for distance measurement, and a deriving program for distance measurement which are capable of deriving the in-image irradiation position with higher accuracy compared to a case where the actual measurement and the actual imaging are performed without performing the provisional measurement and the provisional imaging.

A distance measurement device according to a first aspect of the present invention comprises an imaging unit that images a subject, a measurement unit that measures a distance to the subject by emitting directional light which is light having directivity to the subject and receiving reflection light of the directional light, and a deriving unit that acquires a correspondence relation between an in-provisional-image irradiation position, which corresponds to an irradiation position of the directional light onto the subject, within a provisional image acquired by provisionally imaging the subject by the imaging unit whenever each of a plurality of distances is provisionally measured by the measurement unit and a distance which is provisionally measured by the measurement unit by using the directional light corresponding to the in-provisional-image irradiation position, and derives an in-actual-image irradiation position, which corresponds to the irradiation position of the directional light used in actual measurement performed by the measurement unit, within an actual image acquired by performing actual imaging by the imaging unit, based on the acquired correspondence relation.

Therefore, according to the distance measurement device according to the first aspect of the present invention, it is possible to derive the in-image irradiation position with higher accuracy compared to a case where the actual measurement and the actual imaging are performed without performing the provisional measurement and the provisional imaging.

According to the distance measurement device according to a second aspect of the present invention, in the distance measurement device according to the first aspect of the present invention, the deriving unit derives the in-actual-image irradiation position from a relation between an approximate curve prescribed by the correspondence relation and a distance acquired through the actual measurement.

Therefore, according to the distance measurement device according to the second aspect of the present invention, it is possible to derive the in-actual-image irradiation position with a simple configuration compared to a case where the in-image irradiation position is derived without using the approximate curve prescribed by the correspondence relation.

According to the distance measurement device according to a third aspect of the present invention, in the distance measurement device according to the first aspect of the present invention, the deriving unit derives a parameter that influences the irradiation position based on the correspondence relation and derives the in-actual-image irradiation position based on the derived parameter and a distance acquired through the actual measurement.

Therefore, according to the distance measurement device according to the third aspect of the present invention, it is possible to derive the in-image irradiation position with higher accuracy compared to a case where the in-actual-image irradiation position is derived without deriving the parameter based on the correspondence relation.

According to the distance measurement device according to a fourth aspect of the present invention, in the distance measurement device according to the first aspect of the present invention, the deriving unit derives a parameter that influences the irradiation position based on the correspondence relation.

Therefore, according to the distance measurement device according to the fourth aspect of the present invention, it is possible to derive the parameter with high accuracy compared to a case where the parameter is derived without using the correspondence relation.

According to the distance measurement device according to a fifth aspect of the present invention, in the distance measurement device according to the third or fourth aspect of the present invention, the parameter is at least one of an angle of view (an angle of view on a subject image indicating the subject) on the subject, an angle at which the directional light is emitted, or a reference point distance between a first reference point prescribed for the imaging unit and a second reference point prescribed for the measurement unit.

Therefore, according to the distance measurement device according to the fifth aspect of the present invention, it is possible to derive the angle of view on the subject, the angle at which the directional light is emitted, and the reference point distance with high accuracy compared to a case where the angle of view on the subject, the angle at which the directional light is emitted, and the reference point distance are derived without using the correspondence relation.

According to the distance measurement device according to a sixth aspect of the present invention, in the distance measurement device according to any one of the first to fifth aspects of the present invention, in a case where there is a specific correspondence relation corresponding to a distance acquired through the actual measurement performed by the measurement unit among correspondence relations acquired in the past, the deriving unit derives the in-actual-image irradiation position based on the specific correspondence relation.

Therefore, according to the distance measurement device according to the sixth aspect of the present invention, it is possible to rapidly derive the in-actual-image irradiation position compared to a case where the provisional measurement and the provisional imaging are performed without being omitted in order to derive the in-actual-image irradiation position.

According to the distance measurement device according to a seventh aspect of the present invention, in the distance measurement device according to any one of the first to sixth aspects of the present invention, in a case where a factor for changing a parameter that influences the irradiation position occurs, the deriving unit acquires the correspondence relation.

Therefore, according to the distance measurement device according to the seventh aspect of the present invention, it is possible to prevent unnecessary provisional measurement and provisional imaging compared to a case where the correspondence relation is acquired even though the parameter changing factor for changing the parameter that influences the irradiation position does not occur.

According to the distance measurement device according to an eighth aspect of the present invention, in the distance measurement device according to the seventh aspect of the present invention, the factor is at least one of replacement of a lens of the imaging unit, replacement of the measurement unit, a change in angle of view (an angle of view on a subject image indicating the subject) on a subject captured by the imaging unit, or a change in direction in which the directional light is emitted.

Therefore, according to the distance measurement device according to the eighth aspect of the present invention, it is possible to prevent unnecessary provisional measurement and provisional imaging compared to a case where the correspondence relation is acquired even though any of replacement of the lens of the imaging unit, replacement of the measurement unit, the change in the angle of view on the subject captured by the imaging unit, and the change in the direction in which the directional light is emitted does not occur.

According to the distance measurement device according to a ninth aspect of the present invention, the distance measurement device according to any one of the first to eighth aspects of the present invention further comprises a warning unit that issues a warning in a case where a relation between the plurality of distances which is provisionally measured by the measurement unit is a predetermined relation satisfying that the distances do not effectively contribute to construction of the correspondence relation used in the deriving of the in-actual-image irradiation position performed by the deriving unit.

Therefore, according to the distance measurement device according to the ninth aspect of the present invention, it is possible to prevent a decrease in deriving accuracy of the in-actual-image irradiation position compared to a case where the warning is not issued in a case where the relation between the plurality of provisionally measured distances is a predetermined relation satisfying that these distances do not effectively contribute to the construction of the correspondence relation used in the deriving of the in-actual-image irradiation position.

According to the distance measurement device according to a tenth aspect of the present invention, in the distance measurement device according to any one of the first to ninth aspects of the present invention, at least one of the imaging unit or the measurement unit is detachably attached.

Therefore, according to the distance measurement device according to the tenth aspect of the present invention, it is possible to derive the in-actual-image irradiation position with high accuracy even though the imaging unit and/or the measurement unit is detachably attached compared to a case where the in-actual-image irradiation position is derived without acquiring the correspondence relation even though the imaging unit and/or the measurement unit is detachably attached.

According to the distance measurement device according to an eleventh aspect of the present invention, in the distance measurement device according to any one of the first to tenth aspects of the present invention, a result derived by the deriving unit is displayed on a display unit.

Therefore, according to the distance measurement device according to the eleventh aspect of the present invention, the user can easily ascertain the result derived by the deriving unit compared to a case where the result derived by the deriving unit is not displayed on the display unit.

A deriving method for distance measurement according to a twelfth aspect of the present invention comprises acquiring a correspondence relation between an in-provisional-image irradiation position, which corresponds to an irradiation position of directional light as light having directivity onto a subject, within a provisional image acquired by provisionally imaging the subject by an imaging unit which images the subject whenever each of a plurality of distances is provisionally measured by a measurement unit which measures a distance to the subject by emitting the directional light and receiving reflection light of the directional light and a distance which is provisionally measured by the measurement unit by using the directional light corresponding to the in-provisional-image irradiation position, the measurement unit and the imaging unit being included in a distance measurement device, and deriving an in-actual-image irradiation position, which corresponds to an irradiation position of the directional light used in actual measurement performed by the measurement unit, within an actual image acquired by performing actual imaging by the imaging unit, based on the acquired correspondence relation.

Therefore, according to the deriving method for distance measurement according to the twelfth aspect of the present invention, it is possible to derive the in-image irradiation position with higher accuracy compared to a case where the actual measurement and the actual imaging are performed without performing the provisional measurement and the provisional imaging.

A deriving program for distance measurement according to a thirteenth aspect of the present invention causes a computer to perform a process of acquiring a correspondence relation between an in-provisional-image irradiation position, which corresponds to an irradiation position of directional light as light having directivity onto a subject, within a provisional image acquired by provisionally imaging the subject by an imaging unit which images the subject whenever each of a plurality of distances is provisionally measured by a measurement unit which measures a distance to the subject by emitting the directional light and receiving reflection light of the directional light and a distance which is provisionally measured by the measurement unit by using the directional light corresponding to the in-provisional-image irradiation position, the measurement unit and the imaging unit being included in a distance measurement device, and deriving an in-actual-image irradiation position, which corresponds to an irradiation position of the directional light used in actual measurement performed by the measurement unit, within an actual image acquired by performing actual imaging by the imaging unit, based on the acquired correspondence relation.

Therefore, according to the deriving program for distance measurement according to the thirteenth aspect of the present invention, it is possible to derive the in-image irradiation position with higher accuracy compared to a case where the actual measurement and the actual imaging are performed without performing the provisional measurement and the provisional imaging.

According to one aspect of the present invention, it is possible to derive an effect of acquiring the in-image irradiation position with higher accuracy compared to a case where the actual measurement and the actual imaging are performed without performing the provisional measurement and the provisional imaging.

BRIEF DESCRIPTION OF THE DRAWINGS

FIG. 11 is a conceptual diagram showing an example of a correspondence table according to the first to third embodiments.

FIG. 14 is a screen diagram showing an example of a provisional measurement and provisional imaging guide screen according to the first to third embodiments.

FIG. 15 is a screen diagram showing an example of a re-performing guide screen according to the first to third embodiments.

FIG. 16 is a screen diagram showing an example of a second intention check screen according to the first to third embodiments.

DESCRIPTION OF THE PREFERRED EMBODIMENTS

Figure 1:
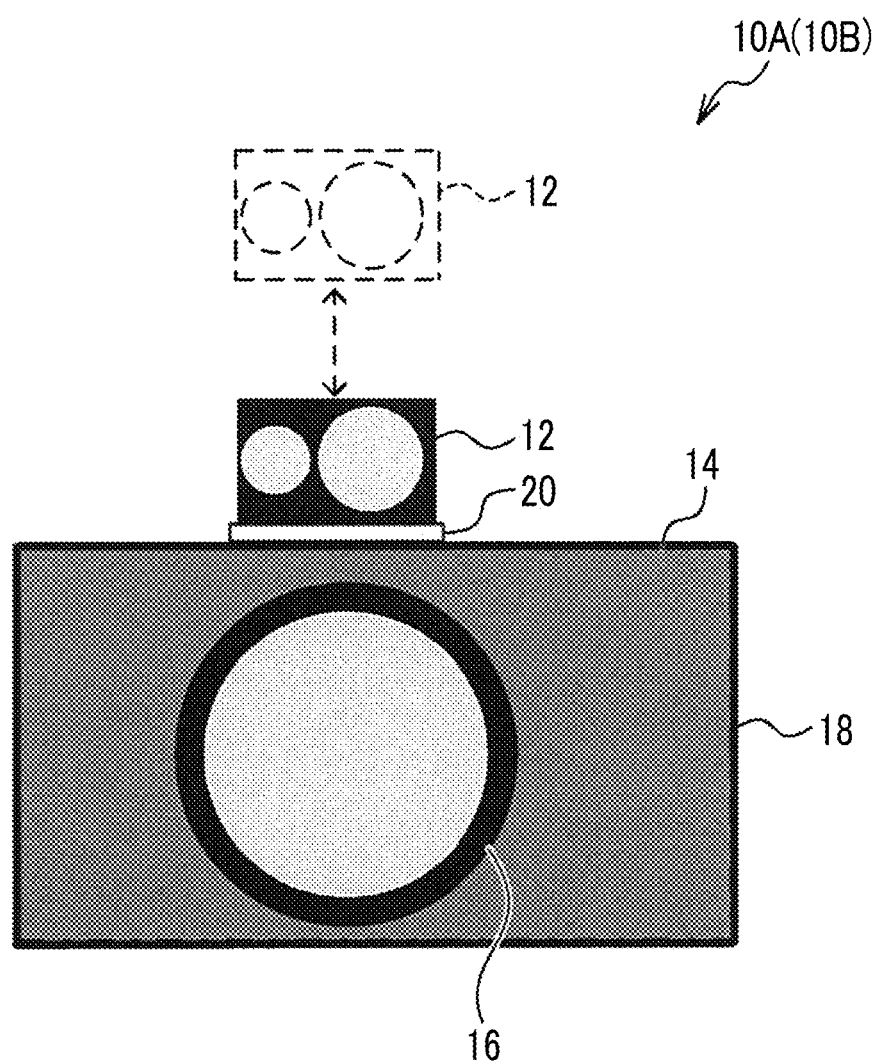
FIG. 1 is a front view showing an example of an external appearance of a distance measurement device according to first and second embodiments.

Hereinafter, an example of an embodiment related to a technology of the present disclosure will be described with reference to the accompanying drawings. In the present embodiment, a distance between a distance measurement device and a subject as a measurement target is simply referred to as a distance for the sake of convenience in description. In the present embodiment, an angle of view on the subject is simply referred to as an "angle of view".

First Embodiment

For example, a distance measurement device 10A according to the first embodiment includes a distance measurement unit 12 and an imaging device 14. In the present embodiment, the distance measurement unit 12 and a distance measurement control unit 68 (see FIG. 2) are an example of a measurement unit according to the technology of the present disclosure, and the imaging device 14 is an example of an imaging unit according to the technology of the present disclosure.

The imaging device 14 includes a lens unit 16 and an imaging device main body 18, and the lens unit 16 is detachably attached to the imaging device main body 18.

A hot shoe 20 is provided on a top surface of the imaging device main body 18, and the distance measurement unit 12 is detachably attached to the hot shoe 20.

The distance measurement device 10A has a distance measurement system function of measuring a distance by emitting a laser beam for distance measurement to the distance measurement unit 12, and an imaging system function of causing the imaging device 14 to acquire a captured image by imaging the subject. Hereinafter, the captured image acquired by imaging the subject by using the imaging device 14 by utilizing the imaging system function is simply referred to as an "image" or a "captured image" for the sake of convenience in description.

The distance measurement device 10A performs one measurement sequence (see FIG. 3) according to one instruction by utilizing the distance measurement system function, and ultimately outputs one distance by performing the one measurement sequence. In the present embodiment, actual measurement and provisional measurement are selectively performed by utilizing the distance measurement system function according to an instruction of a user. The actual measurement means measurement in which a distance measured by utilizing the distance measurement system function is actually used, and the provisional measurement means measurement performed in a preparation stage of increasing the accuracy of the actual measurement.

The distance measurement device 10A has, as an operation mode of the imaging system function, a still image imaging mode and a video imaging mode. The still image imaging mode is an operation mode for imaging a still image, and the video imaging mode is an operation mode of imaging a motion picture. The still image imaging mode and the video imaging mode are selectively set according to an instruction of the user.

In the present embodiment, the actual imaging and the provisional imaging are selectively performed by utilizing the imaging system function according to an instruction of the user. The actual imaging is imaging performed in synchronization with the actual measurement, and the provisional imaging is imaging performed in synchronization with the provisional measurement. Hereinafter, for the sake of convenience in description, an image acquired through the actual imaging is referred to as an "actual captured image", and an image acquired through the provisional imaging is referred to as a "provisional captured image". In a case where it is not necessary to distinguish between the "actual captured image" and the "provisional captured image", the actual captured image and the provisional captured image are referred to as an "image" or a "captured image". Hereinafter, for the sake of convenience in description, the "actual captured image" is also referred to as an "actual image", and the "provisional captured image" is also referred to as a "provisional image".

Figure 2:
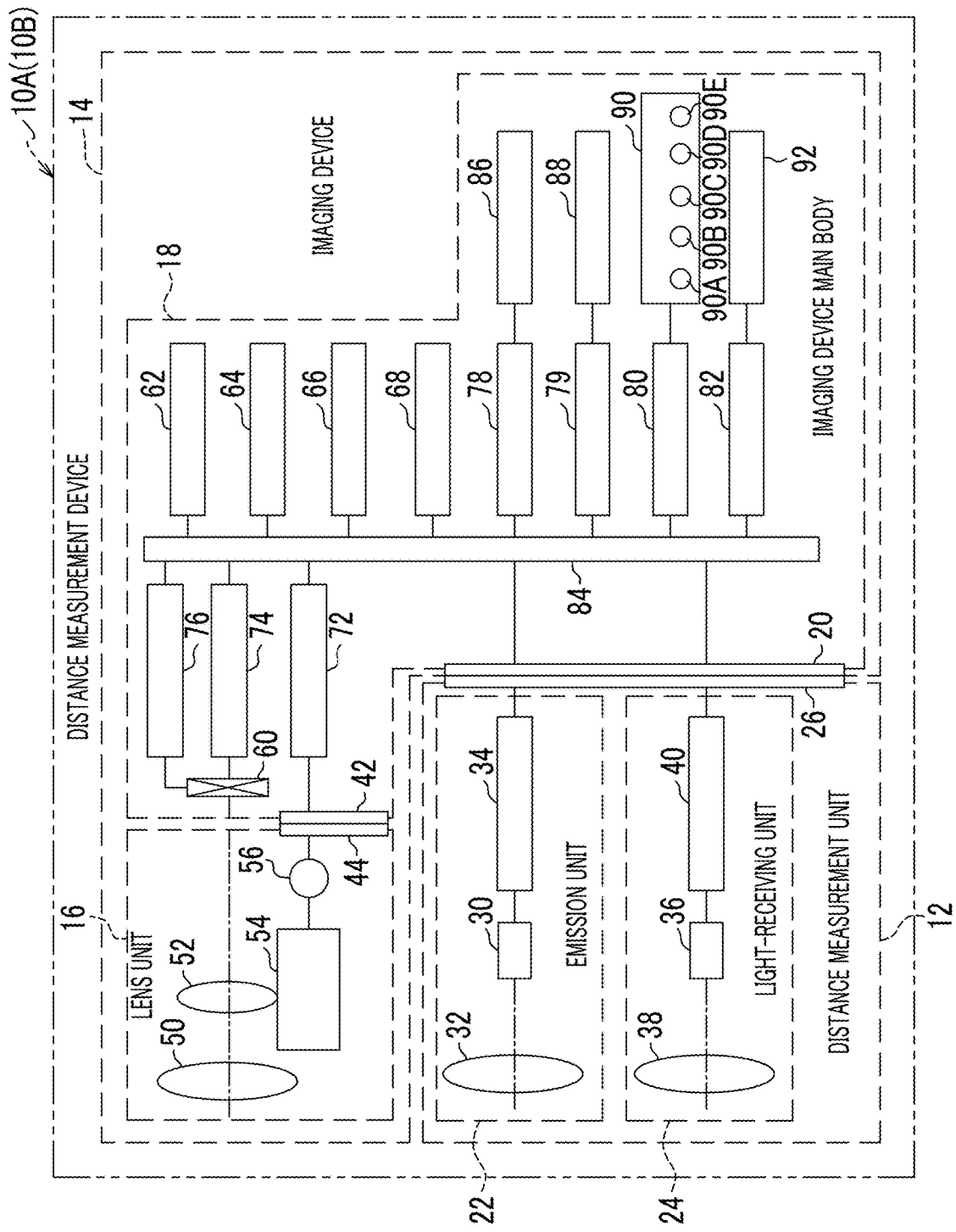
FIG. 2 is a block diagram showing an example of a hardware configuration of main parts of the distance measurement device according to the first and second embodiments.

For example, the distance measurement unit 12 includes an emission unit 22, a light receiving unit 24, and a connector 26, as shown in FIG. 2.

The connector 26 is able to be connected to the hot shoe 20, and the distance measurement unit 12 is operated under the control of the imaging device main body 18 in a state in which the connector 26 is connected to the hot shoe 20.

The emission unit 22 includes a laser diode (LD) 30, a condenser lens (not shown), an object lens 32, and an LD driver 34.

The condenser lens and the object lens 32 are provided along an optical axis of a laser beam emitted by the LD 30, and the condenser lens and the object lens 32 are arranged in order along the optical axis from the LD 30.

The LD 30 emits a laser beam for distance measurement which is an example of directional light according to the technology of the present disclosure. The laser beam emitted by the LD 30 is a colored laser beam. For example, as long as the subject is separated from the emission unit 22 in a range of about several meters, an irradiation position of the laser beam is visually recognized in a real space, and is visually recognized from the captured image acquired by the imaging device 14.

The condenser lens concentrates the laser beam emitted by the LD 30, and factors the concentrated laser beam to pass. The object lens 32 faces the subject, and emits the laser beam that passes through the condenser lens to the subject.

The LD driver 34 is connected to the connector 26 and the LD 30, and drives the LD 30 in order to emit the laser beam according to an instruction of the imaging device main body 18.

The light receiving unit 24 includes a photodiode (PD) 36, an object lens 38, and a light-receiving signal processing circuit 40. The object lens 38 is disposed on a light receiving surface of the PD 36. After the laser beam emitted by the emission unit 22 reaches the subject, a reflection laser beam which is a laser beam reflected from the subject is incident on the object lens 38. The object lens 38 factors the reflection laser beam to pass, and guides the reflection laser beam to the light receiving surface of the PD 36. The PD 36 receives the reflection laser beam that passes through the object lens 38, and outputs an analog signal corresponding to a light reception amount, as a light-receiving signal.

The light-receiving signal processing circuit 40 is connected to the connector 26 and the PD 36, amplifies the light-receiving signal input from the PD 36 by an amplifier (not shown), and performs analog-to-digital (A/D) conversion on the amplified light-receiving signal. The light-receiving signal processing circuit 40 outputs the light-receiving signal digitized through the A/D conversion to the imaging device main body 18.

The imaging device 14 includes mounts 42 and 44. The mount 42 is provided at the imaging device main body 18, and the mount 44 is provided at the lens unit 16. The lens unit 16 is attached to the imaging device main body 18 so as to be replaceable by coupling the mount 42 to the mount 44.

The lens unit 16 includes an imaging lens 50, a zoom lens 52, a zoom lens moving mechanism 54, and a motor 56.

Subject light which is reflected from the subject is incident on the imaging lens 50. The imaging lens 50 factors the subject light to pass, and guides the subject light to the zoom lens 52.

The zoom lens 52 is attached to the zoom lens moving mechanism 54 so as to slide along the optical axis. The motor 56 is connected to the zoom lens moving mechanism 54. The zoom lens moving mechanism 54 receives a power of the motor 56, and factors the zoom lens 52 to slide along an optical axis direction.

The motor 56 is connected to the imaging device main body 18 through the mounts 42 and 44, and the driving of the motor is controlled according to a command from the imaging device main body 18. In the present embodiment, a stepping motor is used as an example of the motor 56. Accordingly, the motor 56 is operated in synchronization with a pulsed power according to a command from the imaging device main body 18.

The imaging device main body 18 includes an imaging element 60, a main control unit 62, an image memory 64, an image processing unit 66, a distance measurement control unit 68, a motor driver 72, an imaging element driver 74, an image signal processing circuit 76, and a display control unit 78. The imaging device main body 18 includes a touch panel interface (I/F) 79, a reception I/F 80, and a media I/F 82.

The main control unit 62, the image memory 64, the image processing unit 66, the distance measurement control unit 68, the motor driver 72, the imaging element driver 74, the image signal processing circuit 76, and the display control unit 78 are connected to a busline 84. The touch panel I/F 79, the reception I/F 80, and the media I/F 82 are also connected to the busline 84.

The imaging element 60 is a complementary metal oxide semiconductor (CMOS) type image sensor, and includes a color filter (not shown). The color filter includes a G filter corresponding to green (G), an R filter corresponding to red (R), and a B filter corresponding to blue (B) which contribute to the acquisition of a brightness signal. The imaging element 60 includes a plurality of pixels (not shown) arranged in a matrix shape, and any filter of the R filter, the G filter, and the B filter included in the color filter is allocated to each pixel.

The subject light that passes through the zoom lens 52 is formed on an imaging surface which is the light receiving surface of the imaging element 60, and electric charges corresponding to the light reception amount of the subject light are accumulated in the pixels of the imaging element 60. The imaging element 60 outputs the charges accumulated in the pixels, as image signals indicating an image corresponding to a subject image acquired by forming the subject light on the imaging surface.

The main control unit 62 controls the entire distance measurement device 10A through the busline 84.

The motor driver 72 is connected to the motor 56 through the mounts 42 and 44, and controls the motor 56 according to an instruction of the main control unit 62.

The imaging device 14 has an angle-of-view changing function. The angle-of-view changing function is a function of changing an angle of view on the subject by moving the zoom lens 52. In the present embodiment, the angle-of-view changing function is realized by the zoom lens 52, the zoom lens moving mechanism 54, the motor 56, the motor driver 72, and the main control unit 62. Although it has been described in the present embodiment that the optical angle-of-view changing function using the zoom lens 52 is used, the technology of the present disclosure is not limited thereto, and an electronic angle of view changing function without using the zoom lens 52 may be used.

The imaging element driver 74 is connected to the imaging element 60, and supplies drive pulses to the imaging element 60 under the control of the main control unit 62. The pixels of the imaging element 60 are driven according to the drive pulses supplied by the imaging element driver 74.

The image signal processing circuit 76 is connected to the imaging element 60, and reads image signals corresponding to one frame for every pixel out of the imaging element 60 under the control of the main control unit 62. The image signal processing circuit 76 performs various processing tasks such as correlative double sampling processing, automatic gain adjustment, and A/D conversion on the readout image signals. The image signal processing circuit 76 outputs image signals digitized by performing various processing tasks on the image signals for every frame to the image memory 64 at a specific frame rate (for example, tens of frames/second) prescribed by an analog signal supplied from the main control unit 62. The image memory 64 provisionally retains the image signals input from the image signal processing circuit 76.

The imaging device main body 18 includes a display unit 86, a touch panel 88, a reception device 90, and a memory card 92.

An alarm unit and the display unit 86 which is an example of a display unit according to the technology of the present disclosure are connected to the display control unit 78, and display various information items under the control of the display control unit 78. The display unit 86 is realized by a liquid crystal display (LCD), for example.

The touch panel 88 is layered on a display screen of the display unit 86, and senses touch using a pointer such as a finger of the user and/or a touch pen. The touch panel 88 is connected to the touch panel I/F 79, and outputs positional information indicating a position touched by the pointer to the touch panel I/F 79. The touch panel I/F 79 activates the touch panel 88 according to an instruction of the main control unit 62, and outputs the positional information input from the touch panel 88 to the main control unit 62.

The reception device 90 includes an actual measurement and actual imaging button 90A, a provisional measurement and provisional imaging button 90B, an imaging system operation mode switching button 90C, a wide angle instruction button 90D, and a telephoto instruction button 90E, and receives various instructions from the user. The reception device 90 is connected to the reception I/F 80, and the reception I/F 80 outputs an instruction content signal indicating the content of the instruction received by the reception device 90 to the main control unit 62.

The actual measurement and actual imaging button 90A is a pressing type button that receives an instruction to start the actual measurement and the actual imaging. The provisional measurement and provisional imaging button 90B is a pressing type button that receives an instruction to start the provisional measurement and the provisional imaging. The imaging system operation mode switching button 90C is a pressing type button that receives an instruction to switch between the still image imaging mode and the video imaging mode.

The wide angle instruction button 90D is a pressing type button that receives an instruction to change the angle of view to a wide angle, and a degree of the angle of view changed to the wide angle is determined in an allowable range depending on a pressing time during which the wide angle instruction button 90D is continuously pressed.

The telephoto instruction button 90E is a pressing type button that receives an instruction to change the angle of view to an angle of a telephoto lens, and a degree of the angle of view changed to the angle of the telephoto lens is determined in an allowable range depending on a pressing time during which the telephoto instruction button 90E is continuously pressed.

Hereinafter, the actual measurement and actual imaging button and the provisional measurement and provisional imaging button are referred to as a "release button" for the sake of convenience in description in a case where it is not necessary to distinguish between the actual measurement and actual imaging button 90A and the provisional measurement and provisional imaging button 90B. Hereinafter, the wide angle instruction button and the telephoto instruction button are referred to as an "angle-of-view instruction button" for the sake of convenience in description in a case where it is not necessary to distinguish between the wide angle instruction button 90D and the telephoto instruction button 90E.

In the distance measurement device 10A according to the first embodiment, a manual focus mode and an auto focus mode are selectively set according to an instruction of the user through the reception device 90. The release button receives two-step pressing operations including an imaging preparation instruction state and an imaging instruction state. For example, the imaging preparation instruction state refers to a state in which the release button is pressed down from a waiting position to an intermediate position (half pressed position), and the imaging instruction state refers to a state in which the release button is pressed down to a finally pressed-down position (fully pressed position). Hereinafter, for the sake of convenience in description, a "state in which the release button is pressed down from the waiting position to the half pressed position" is referred to as a "half pressed state", and a "state in which the release button is pressed down from the waiting position to the fully pressed position" is referred to as a "fully pressed state".

In the auto focus mode, after an imaging condition is adjusted by setting the release button to be in the half pressed state, actual exposing is subsequently performed by setting the release button to be in the fully pressed state. That is, in a case where the release button is set to be in the half pressed state before the actual exposing is performed, an automatic exposure (AE) function, and thus, exposure is adjusted. Thereafter, a focus is adjusted by performing auto-focus (AF) function, and the actual exposing is performed in a case where the release button is set to be in the fully pressed state.

In this example, the actual exposing refers to exposing performed in order to acquire a still image file to be described below. In the present embodiment, the exposing means exposing performed in order to acquire a live view image to be described below and exposition performed in order to acquire a motion picture image file to be described below in addition to the actual exposing. Hereinafter, for the sake of convenience in description, the exposing is simply referred to as "exposing" in a case where it is not necessary to distinguish between these exposing tasks.

In the present embodiment, the main control unit 62 performs the exposure adjustment using the AE function and the focus adjustment using the AF function. Although it has been described in the present embodiment that the exposure adjustment and the focus adjustment are performed, the technology of the present disclosure is not limited to thereto, and the exposure adjustment or the focus adjustment may not be performed.

The image processing unit 66 acquires image signals for every frame from the image memory 64 at a specific frame rate, and performs various processing tasks such as gamma correction, luminance and color difference conversion, and compression processing on the acquired image signals.

The image processing unit 66 outputs the image signals acquired by performing various processing tasks to the display control unit 78 for every frame at a specific frame rate. The image processing unit 66 outputs the image signals acquired by performing various processing tasks to the main control unit 62 according to a request of the main control unit 62.

The display control unit 78 outputs the image signals input from the image processing unit 66 to the display unit 86 for every frame at a specific frame rate under the control of the main control unit 62.

The display unit 86 displays image and character information. The display unit 86 displays the image indicated by the image signals input from the display control unit 78 at a specific frame rate, as a live view image. The live view image is continuous frame images captured in continuous frames, and is also referred to as live preview image. The display unit 86 also displays the still image which is a single frame image captured in a single frame. The display unit 86 also displays a playback image and/or a menu screen in addition to the live view image.

Although the image processing unit 66 and the display control unit 78 are realized by an application specific integrated circuit (ASIC) in the present embodiment, the technology of the present disclosure is not limited thereto. For example, the image processing unit 66 and the display control unit 78 may be realized by a field-programmable gate array (FPGA). The image processing unit 66 may be realized by a computer including a central processing unit (CPU), a read only memory (ROM), and a random access memory (RAM). The display control unit 78 may also be realized by a computer including a CPU, a ROM, and a RAM. The image processing unit 66 and the display control unit 78 may be realized by combining of a hardware configuration and a software configuration.

In a case where an instruction to image the still image is received by the release button in the still image imaging mode, the main control unit 62 factors the imaging element 60 to expose one frame by controlling the imaging element driver 74. The main control unit 62 acquires the image signals acquired by exposing one frame from the image processing unit 66, and generates the still image file having a specific still image format by performing a compression process on the acquired image signals. For example, the specific still image format refers to the Joint Photographic Experts Group (JPEG).

In a case where an instruction to image the motion picture is received by the release button in the video imaging mode, the main control unit 62 acquire the image signals output to the display control unit 78 in order to be used as the live view image, by the image processing unit 66 for every frame at a specific frame rate. The main control unit 62 generates a motion picture file having a specific motion picture format by performing the compression process on the image signals acquired from the image processing unit 66. For example, the specific motion picture format refers to the Moving Picture Experts Group (MPEG). Hereinafter, the still image file and the motion picture file are referred to as the image file for the sake of convenience in description in a case where it is not necessary to distinguish between the still image file and the motion picture file.

The media I/F 82 is connected to the memory card 92, and records and reads the image file in and out of the memory card 92 under the control of the main control unit 62. The main control unit 62 performs a decompression process on the image file read out of the memory card 92 by the media I/F 82, and displays the decompressed image file as a playback image on the display unit 86.

The main control unit 62 stores distance measurement information including at least one of distance information input from the distance measurement control unit 68 or dimension information indicating a dimension derived by utilizing a dimension deriving function to be described below in association with the image file in the memory card 92 through the media I/F 82. The distance measurement information together with the image file is read out of the memory card 92 by the main control unit 62 through the media I/F 82. In a case where the distance information is included in the distance measurement information read out by the main control unit 62, the distance indicated by the distance information together with the playback image which is the associated image file is displayed on the display unit 86. In a case where the dimension information is included in the distance measurement information read out by the main control unit 62, the dimension indicated by the dimension information together with the playback image which is the associated image file is displayed on the display unit 86.

The distance measurement control unit 68 controls the distance measurement unit 12 under the control of the main control unit 62. In the present embodiment, the distance measurement control unit 68 is realized by ASIC, but the technology of the present disclosure is not limited thereto. For example, the distance measurement control unit 68 may be realized by FPGA. The distance measurement control unit 68 may be realized by a computer including a CPU, a ROM, and a RAM. The distance measurement control unit 68 may be realized by the combination of the hardware configuration and the software configuration.

The hot shoe 20 is connected to the busline 84. Under the control of the main control unit 62, the distance measurement control unit 68 controls the emission of the laser beam from the LD 30 by controlling the LD driver 34, and acquires light-receiving signal from the light-receiving signal processing circuit 40. The distance measurement control unit 68 derives a distance to the subject based on a timing when the laser beam is emitted and a timing when the light-receiving signal is acquired, and outputs distance information indicating the derived distance to the main control unit 62.

The measurement of the distance to the subject using the distance measurement control unit 68 will be described in more detail.

Figure 3:
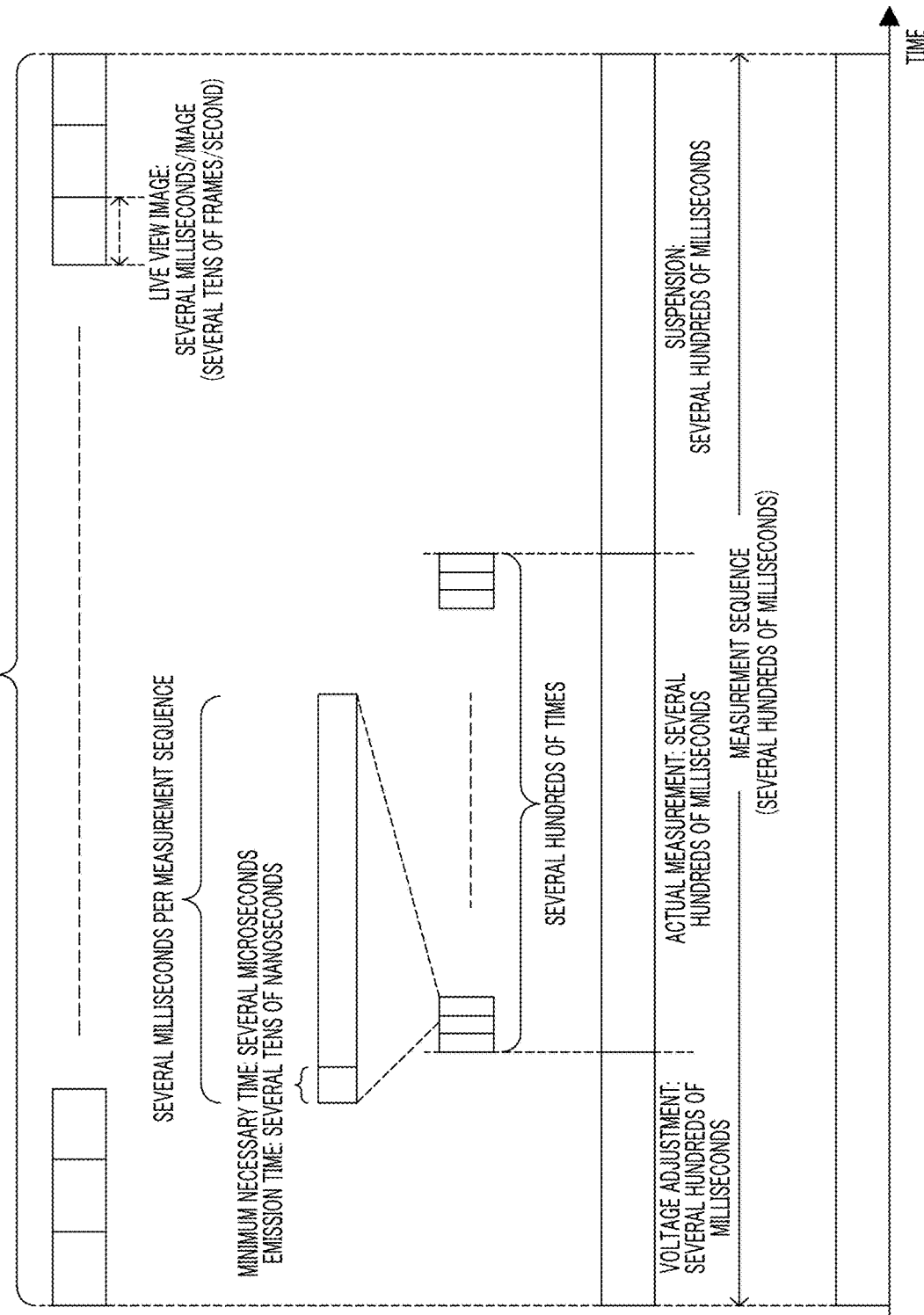
FIG. 3 is a time chart showing an example of a measurement sequence using the distance measurement device according to the first to third embodiments.

For example, one measurement sequence using the distance measurement device 10A is prescribed by a voltage adjustment period, an actual measurement period, and a suspension period, as shown in FIG. 3.

The voltage adjustment period is a period during which driving voltages of the LD 30 and the PD 36 are adjusted.

The actual measurement period is a period during which the distance to the subject is actually measured. For the actual measurement period, an operation for causing the LD 30 to emit the laser beam and causing the PD 36 to receive the reflection laser beam hundreds of times is repeated several hundreds of times, and the distance to the subject is derived based on the timing when the laser beam is emitted and the timing when the light-receiving signal is acquired. The suspension period is a period during which the driving of the LD 30 and the PD 36 is suspended. Thus, in one measurement sequence, the measurement of the distance to the subject is performed hundreds of times.

In the present embodiment, each of the voltage adjustment period, the actual measurement period, and the suspension period is hundreds of milliseconds.

Figure 4:
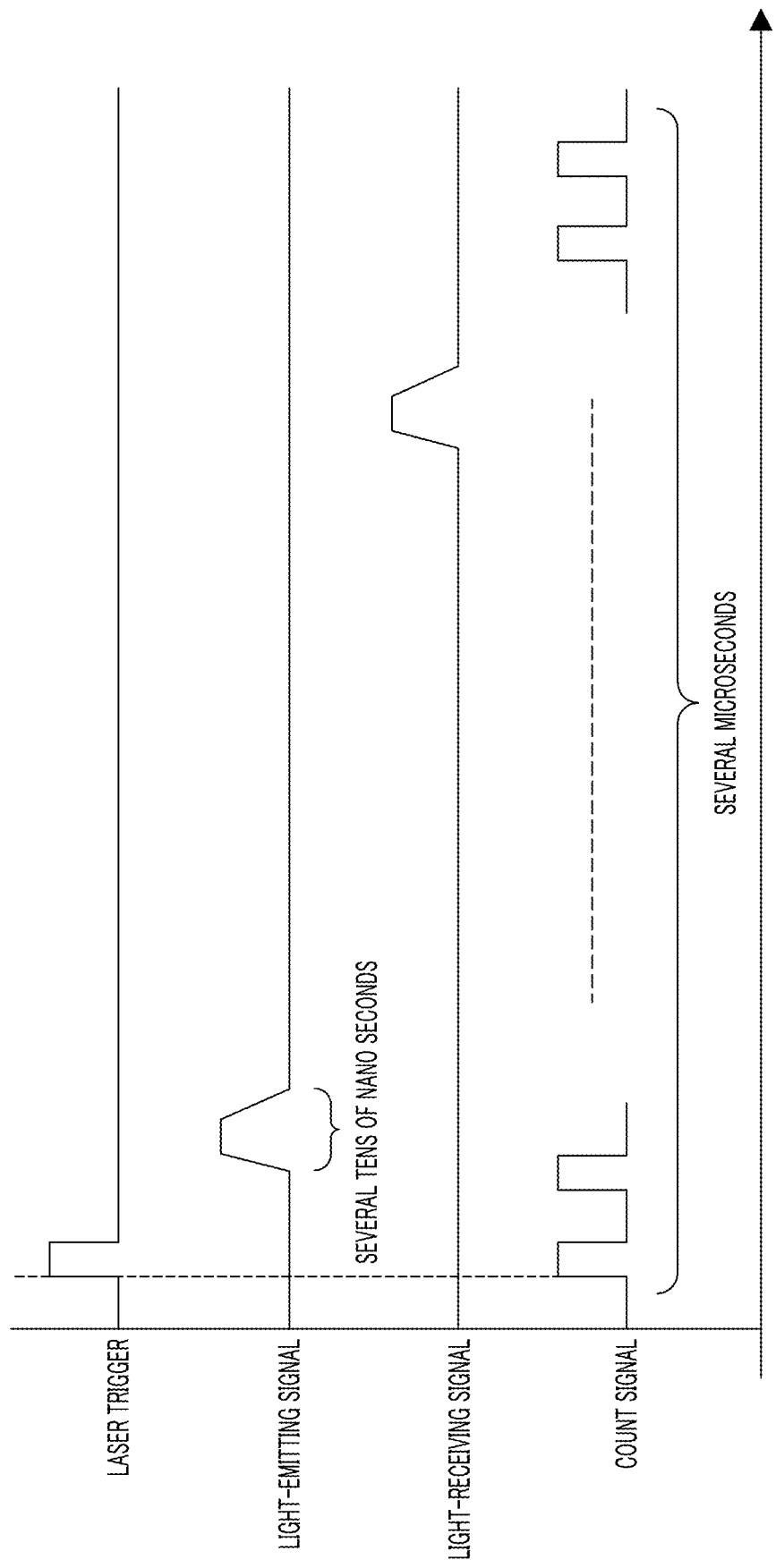
FIG. 4 is a time chart showing an example of a laser trigger, a light-emitting signal, a light-receiving signal, and a count signal required in a case where measurement using the distance measurement device according to the first to third embodiments is performed once.

For example, as shown in FIG. 4, count signals that prescribes a timing when the distance measurement control unit 68 outputs an instruction to emit the laser beam and a timing when the distance measurement control unit 68 acquires the light-receiving signal are supplied to the distance measurement control unit 68. In the present embodiment, the count signals are generated by the main control unit 62 and are supplied to the distance measurement control unit 68, but the present embodiment is not limited thereto. The count signals may be generated by a dedicated circuit such as a time counter connected to the busline 84, and may be supplied to the distance measurement control unit 68.

The distance measurement control unit 68 outputs a laser trigger for emitting the laser beam to the LD driver 34 in response to the count signal. The LD driver 34 drives the LD 30 to emit the laser beam in response to the laser trigger.

In the example shown in FIG. 4, a time during which the laser beam is emitted is tens of nanoseconds. A time during which the laser beam emitted to the subject far away from the emission unit 22 by several kilometers is received as the reflection laser beam by the PD 36 is "several kilometers× 2/light speed"=several microseconds. Accordingly, for example, it takes a time of several microseconds as a minimum necessary time to measure the distance to the subject far away by several kilometers, as shown in FIG. 3.

In the present embodiment, for example, although a time during which the measurement is performed once is several milliseconds with consideration for a time during which the laser beam travels in a reciprocating motion as shown in FIG. 3, since the time during which the laser beam travels in the reciprocating motion varies depending on the distance to the subject, the measurement time per one time may varies depending on an assumed distance.

For example, in a case where the distance to the subject is derived based on the measurement values acquired through the measurement performed several hundreds of times in one measurement sequence, the distance measurement control unit 68 derives the distance to the subject by analyzing a histogram of the measurement values acquired through the measurement performed several hundreds of times.

Figure 5:
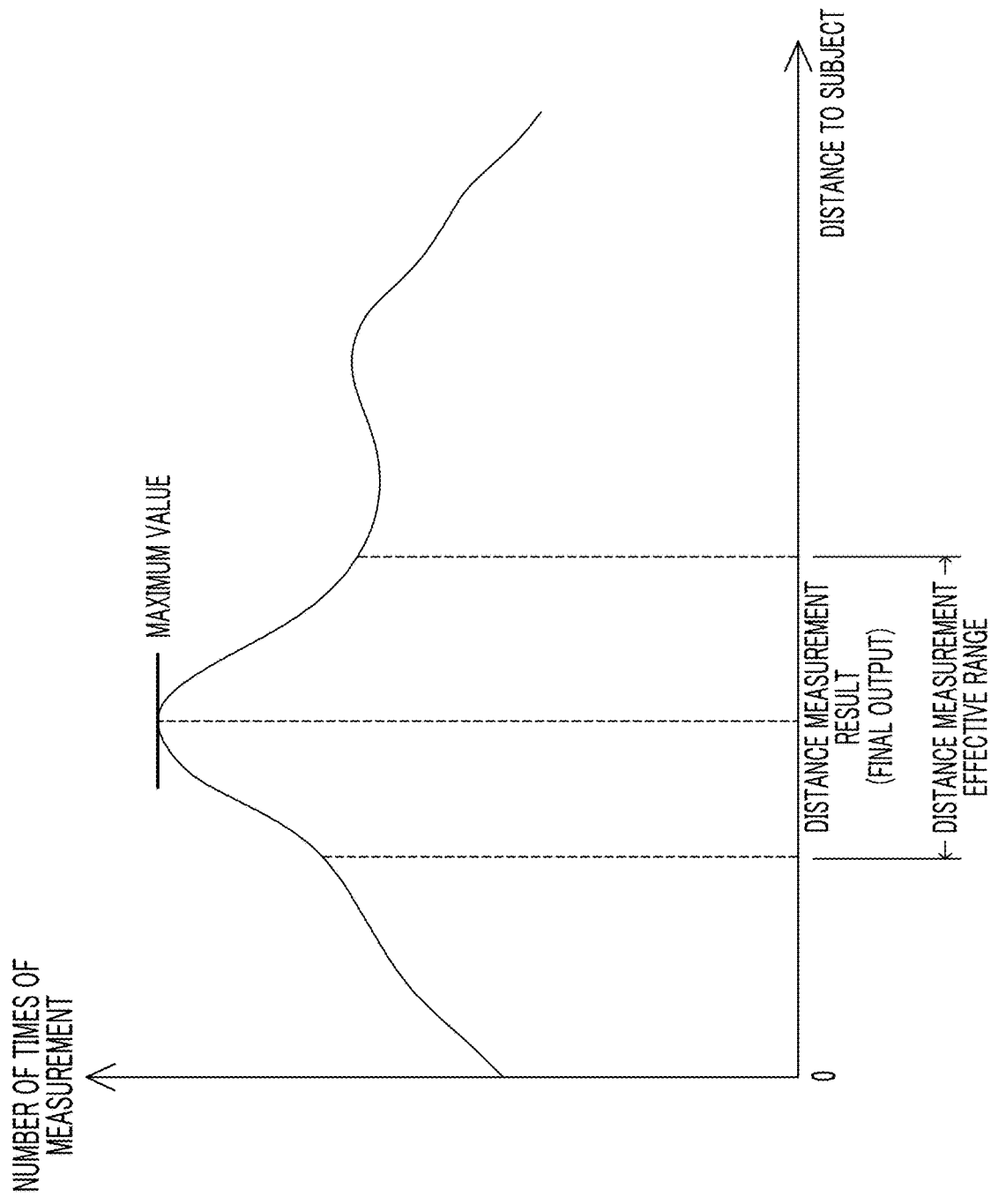
FIG. 5 is a graph showing an example of a histogram (a histogram in a case where a lateral axis represents a distance (measurement value) to the subject and a longitudinal axis represents the number of times the measurement is performed) of measurement values acquired in the measurement sequence using the distance measurement device according to the first to third embodiments.

For example, in the histogram of the measurement values acquired through the measurement performed several hundreds of times in one measurement sequence as shown in FIG. 5, a lateral axis represents the distance to the subject, and a longitudinal axis is the number of times the measurement is performed. The distance corresponding to the maximum value of the number of times the measurement is performed is derived as the distance measurement result by the distance measurement control unit 68. The histogram shown in FIG. 5 is merely an example, and the histogram may be generated based on the time during which the laser beam travels in the reciprocating motion (an elapsed time from when the laser beam is emitted to when the laser beam is received) and/or ½ of the time during which the laser beam travels in the reciprocating motion instead of the distance to the subject.

Figure 6:
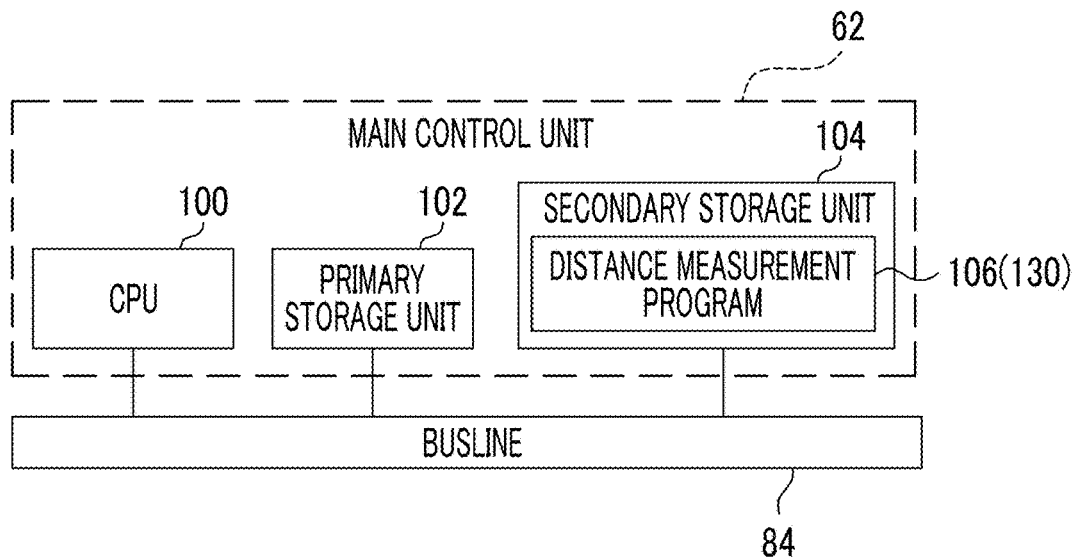
FIG. 6 is a block diagram showing an example of a hardware configuration of a main control unit included in the distance measurement device according to the first to third embodiments.

For example, the main control unit 62 includes the CPU 100 which is an example of a deriving unit according to the technology of the present disclosure, as shown in FIG. 6. The main control unit 62 includes a primary storage unit 102 and a secondary storage unit 104. The CPU 100 controls the entire distance measurement device 10A. The primary storage unit 102 is a volatile memory used as a work area when various programs are executed. A RAM is used as an example of the primary storage unit 102. The secondary storage unit 104 is a non-volatile memory that previously stores various parameters and/or control programs for controlling the activation of the distance measurement device 10A. Electrically erasable programmable read only memory (EEPROM) and/or a flash memory are used as an example of the secondary storage unit 104. The CPU 100, the primary storage unit 102, and the secondary storage unit 104 are connected to each other through the busline 84.

Figure 7:
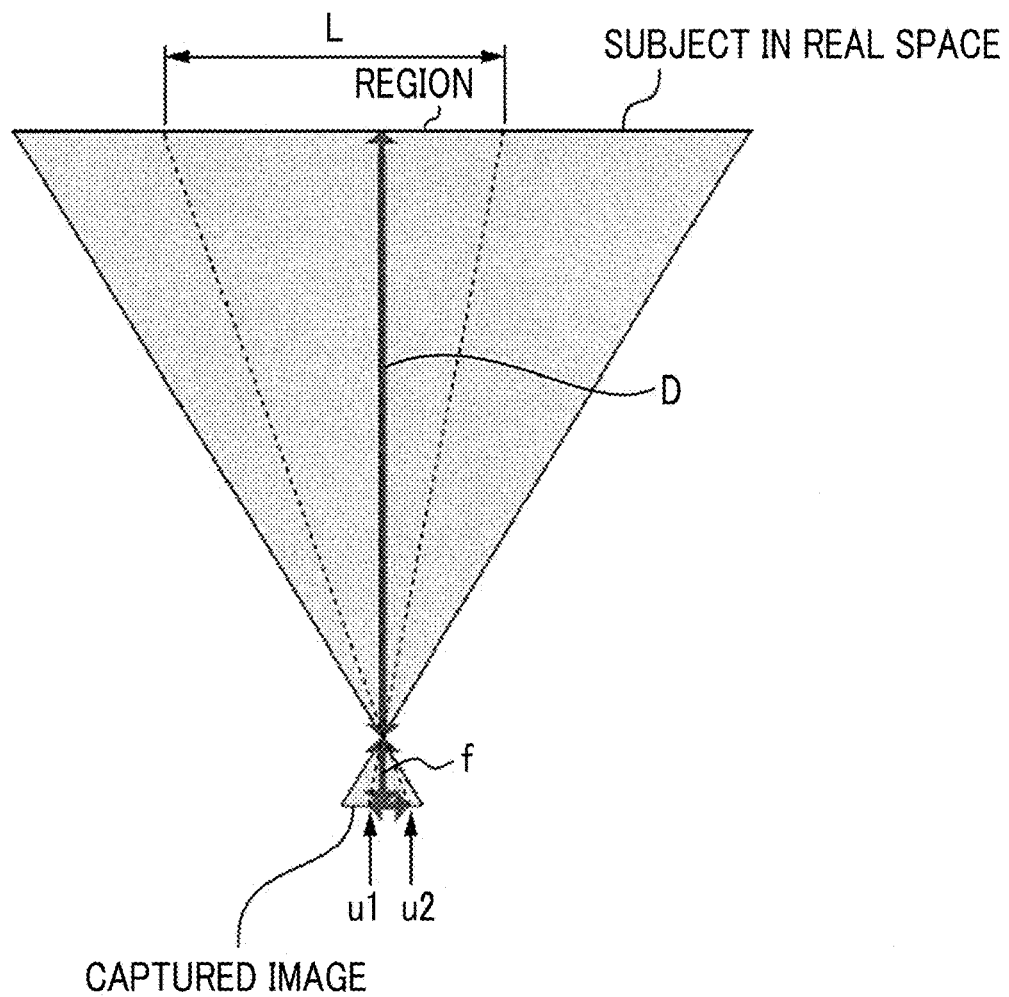
FIG. 7 is an explanatory diagram for describing a method of measuring a dimension (length) of a designated region.

Incidentally, the distance measurement device 10A has the dimension deriving function. For example, as shown in FIG. 7, the dimension deriving function refers to a function of deriving a length L of a region in a real space included in the subject based on addresses u1 and u2 of the designated pixels and a distance D measured by the distance measurement device 10A or deriving an area based on the length L. For example, the "designated pixels" refer to pixels of the imaging element 60 corresponding to two points designated by the user on the live view image. For example, the length L is derived from the following Expression (1). In Expression (1), p is a pitch between pixels included in the imaging element 60, u1 and u2 are addresses of the pixels designated by the user, and f is a focal length of the imaging lens 50.

[Expression 1]

$$L = D \times \left\{ \frac{p(u1 - u2)}{f} \right\} \tag{1}$$

Expression (1) is an expression used on the assumption that a target as a dimension deriving target is captured in a state in which the target faces the imaging lens 50 in front view. Accordingly, for example, in a case where the subject including the target as the dimension deriving target is captured in a state in which the target does not face the imaging lens 50 in front view, a projection conversion process is performed. For example, the projection conversion process refers to a process of converting the captured image acquired through the imaging and/or an image of a square portion of the captured image into a facing view image based on the square image included in the captured image by using the known technology such as affine transformation. The facing view image refers to an image in a state in the subject faces the imaging lens 50 in front view. The addresses u1 and u2 of the pixels of the imaging element 60 are designated through the facing view image, and the length L is derived from Expression (1).

As stated above, it is preferable that an in-image irradiation position is derived with high accuracy and is ascertained together with the distance by the user in order to accurately derive the length L of the region in the real space based on the addresses u1 and u2. The reason is that the derived length L is completely different from the actual length in a case where it is assumed that the in-image irradiation position and the irradiation position of the laser beam in the real space are positions on planes of which orientations and positions are different.

For example, in the distance measurement device 10A, the secondary storage unit 104 stores a distance measurement program 106 which is an example of a deriving program for distance measurement according to the technology of the present disclosure, as shown in FIG. 6. The CPU 100 is operated as the deriving unit according to the technology of the present disclosure by reading the distance measurement program 106 out of the secondary storage unit 104, loading the readout distance measurement program into the primary storage unit 102, and executing the distance measurement program 106.

That is, the CPU 100 acquires the correspondence relation between an in-provisional-image irradiation position and a distance which are provisionally measured by the distance measurement unit 12 and the distance measurement control unit 68 by using the laser beam corresponding to the in-provisional-image irradiation position. The CPU 100 derives an in-actual-image irradiation position, which corresponds to the irradiation position of the laser beam used in the actual measurement using the distance measurement unit 12 and the distance measurement control unit 68, within the actual image acquired by performing the actual imaging by the imaging device 14 based on the acquired correspondence relation. The in-provisional-image irradiation position refers to a position, which corresponds to the irradiation position of the laser beam onto the subject, within a provisional image acquired by performing the provisional imaging on the subject by the imaging device 14 whenever each of a plurality of distances is provisionally measured by the distance measurement unit 12 and the distance measurement control unit 68.

Hereinafter, the in-actual-image irradiation position and the in-provisional-image irradiation position are simply referred to as the "in-image irradiation position" in a case where it is not necessary to distinguish between the in-actual-image irradiation position and the in-provisional-image irradiation position for the sake of convenience in description. In the present embodiment, irradiation-position pixel coordinates are derived by the CPU 100, and the in-image irradiation position is specified from the derived irradiation-position pixel coordinates. That is, a case where the irradiation-position pixel coordinates are derived means that the in-image irradiation position is derived.

Next, a distance measurement process realized as the operation of the distance measurement device 10A by executing the distance measurement program 106 in the CPU 100 in a case where a power switch of the distance measurement device 10A is turned on will be described with reference to FIGS. 8 to 10. Hereinafter, a case where the live view image is displayed on the display unit 86 will be described for the sake of convenience in description. Hereinafter, the irradiation position of the laser beam onto the subject in the real space is referred to as a "real-space irradiation position" for the sake of convenience in description.

Although it will be described below that an in-image irradiation position in an X direction which is a front-view left-right direction for the imaging surface of the imaging element 60 included in the imaging device 14 is derived for the sake of convenience in description, an in-image irradiation position in a Y direction which is a front-view upper-lower direction for the imaging surface of the imaging element 60 included in the imaging device 14 is similarly derived. As mentioned above, the in-image irradiation positions ultimately output by deriving the in-image irradiation positions in the X direction and the Y direction are expressed by two-dimensional coordinates.

Hereinafter, for the sake of convenience in description, the front-view left-right direction for the imaging surface of the imaging element 60 included in the imaging device 14 is referred to as the "X direction" or a "row direction", and the front-view upper-lower direction for the imaging surface of the imaging element 60 included in the imaging device 14 is referred to as the "Y direction" or a "column direction".

Figure 8:
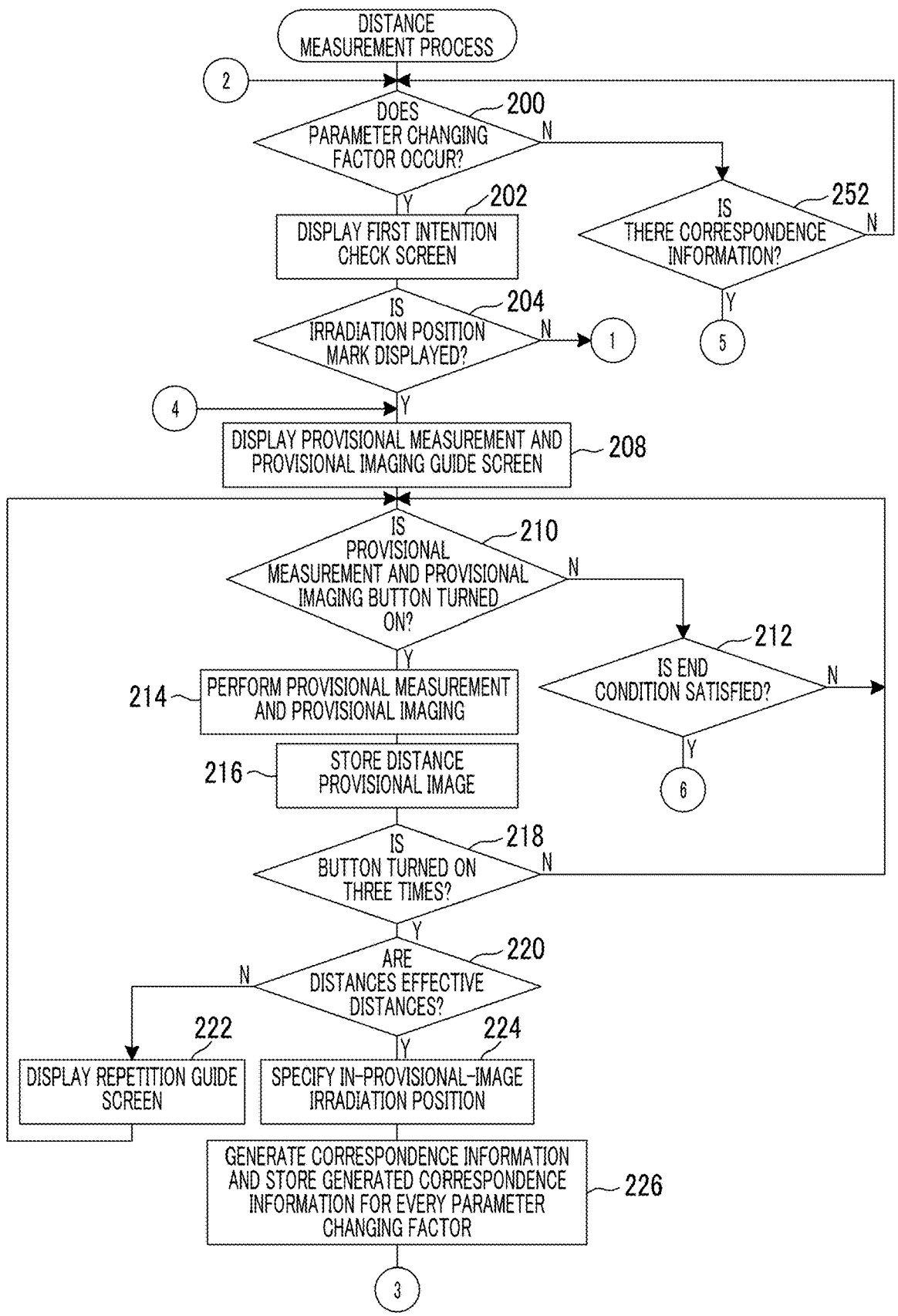
FIG. 8 is a flowchart showing an example of a flow of a distance measurement process according to the first to third embodiments.

In the distance measurement process shown in FIG. 8, the CPU 100 initially determines whether or not a parameter changing factor occurs in step 200. The parameter changing factor refers to a factor for changing parameters that influence the real-space irradiation position.

Figure 12:
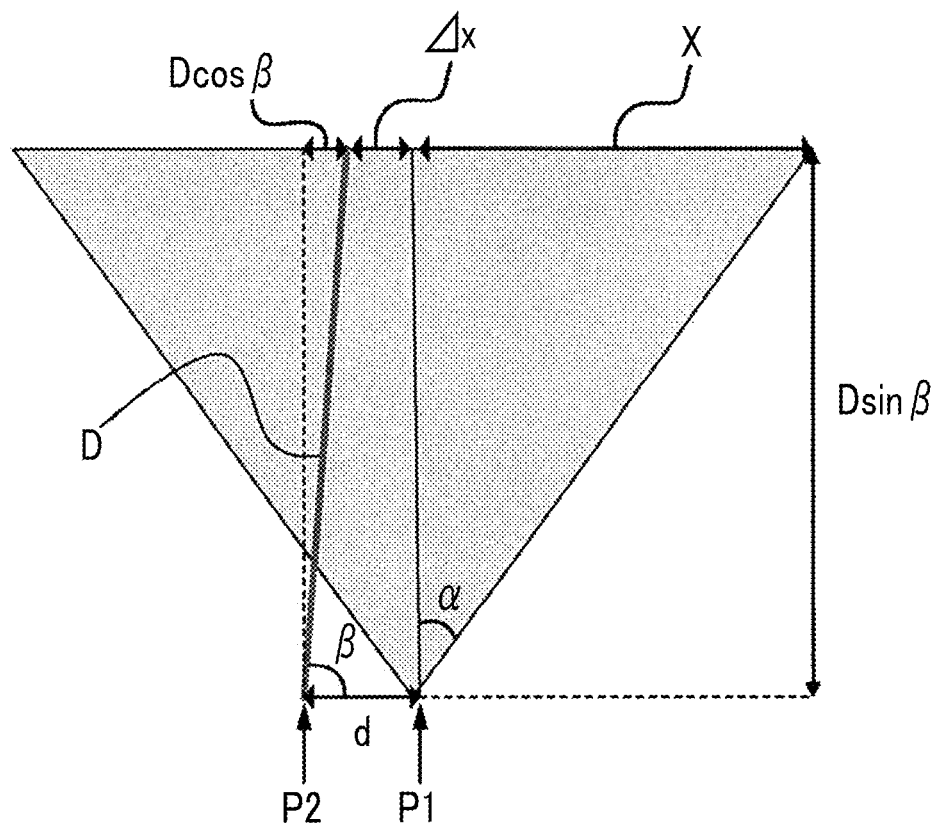
FIG. 12 is an explanatory diagram for describing a parameter that influences a real-space irradiation position.

In the present embodiment, the parameters refer to a half angle of view α, an emission angle β, and a inter-reference-point distance d, as shown in FIG. 12. The half angle of view α refers to half of the angle of view on the subject captured by the imaging device 14. The emission angle β refers to an angle at which the laser beam is emitted from the emission unit 22. The inter-reference-point distance d refers to a distance between a first reference point P1 prescribed for the imaging device 14 and a second base reference point P2 prescribed for the distance measurement unit 12. A main point of the imaging lens 50 is used as an example of the first reference point P1. A point previously set as an origin of coordinates capable of specifying a position of the distance measurement unit 12 in a three dimensional space is used as an example of the second reference point P2. Specifically, an end of front-view left and right ends of the object lens 38 or one vertex of a housing (not shown) of the distance measurement unit 12 in a case where the housing has a cuboid shape.

In the present embodiment, the parameter changing factor refers to, for example, replacement of the lens, the replacement of the distance measurement unit, a change in the angle of view, and a change in the emission direction. Thus, the determination result is positive in a case where at least one of the replacement of the lens, the replacement of the distance measurement unit, the change in the angle of view, and the change in the emission direction occurs in step 200.

The replacement of the lens refers to the replacement of only the imaging lens 50 of the lens unit 16 and the replacement of the lens unit 16 itself. The replacement of the distance measurement unit refers to the replacement of only the object lens 32 of the distance measurement unit 12, the replacement of only the object lens 38 of the distance measurement unit 12, and the replacement of the distance measurement unit 12 itself. The change in the angle of view refers to a change in the angle of view by the movement of the zoom lens 52 by pressing the angle-of-view instruction button. The change in the emission direction refers to a change in the direction in which the laser beam is emitted by the emission unit 22.

In a case where the parameter changing factor occurs in step 200, the determination result is positive, and the process proceeds to step 202.

Figure 13:
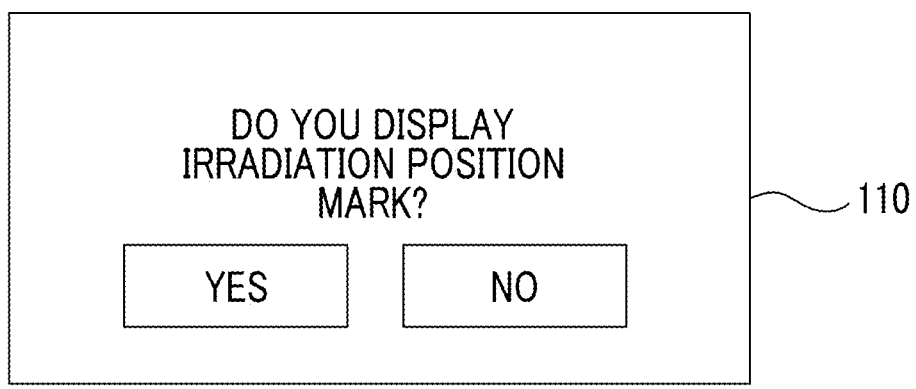
FIG. 13 is a screen diagram showing an example of a first intention check screen according to the first to third embodiments.

For example, the CPU 100 displays a first intention check screen 110 on the display unit 86 in step 202 as shown in FIG. 13. Thereafter, the process proceeds to step 204.

The first intention check screen 110 is a screen for checking the user's intention of whether or not to display an irradiation position mark 116 (see FIG. 17) which is a mark indicating the in-actual-image irradiation position in a specifiable manner within a display area of the actual image. In the example shown in FIG. 13, a message of "do you display the irradiation position mark?" is displayed on the first intention check screen 110. In the example shown in FIG. 13, a soft key of "yes" designated for announcing an intention to display the irradiation position mark 116 and a soft key of "no" designated for announcing an intention not to display the irradiation position mark 116 are also displayed on the first intention check screen 110.

In step 204, the CPU 100 determines whether or not to display the irradiation position mark 116. In a case where the irradiation position mark 116 is displayed in step 204, that is, in a case where the soft key of "yes" of the first intention check screen 110 is pressed through the touch panel 88, the determination result is positive, and the process proceeds to step 208. In a case where the irradiation position mark 116 is not displayed in step 204, that is, in a case where the soft key of "no" of the first intention check screen 110 is pressed through the touch panel 88, the determination result is negative, and the process proceeds to step 290 shown in FIG. 9.

Figure 9:
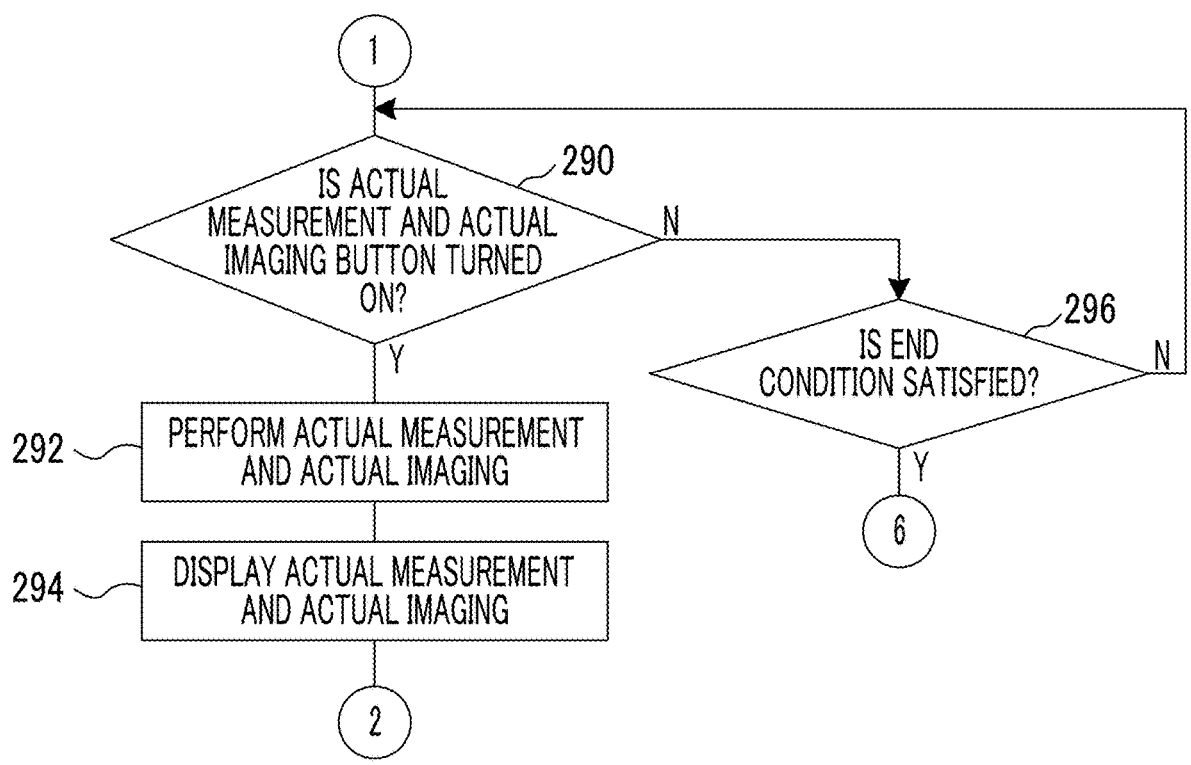
FIG. 9 is a flowchart subsequent to the flowchart shown in FIG. 8.

In step 290 shown in FIG. 9, the CPU 100 determines whether or not the actual measurement and actual imaging button 90A is turned on. In a case where the actual measurement and actual imaging button 90A is turned on in step 290, the determination result is positive, and the process proceeds to step 292.

In step 292, the CPU 100 performs the actual measurement by controlling the distance measurement control unit 68. The CPU 100 performs the actual imaging by controlling the imaging element driver 74 and the image signal processing circuit 76. Thereafter, the process proceeds to step 294.

In step 294, the CPU 100 displays the actual image which is the image acquired by performing the actual imaging and the distance acquired by performing the actual measurement on the display unit 86. Thereafter, the process proceeds to step 200 shown in FIG. 8.

Meanwhile, in a case where the actual measurement and actual imaging button 90A is not turned on in step 290, the determination result is negative, and the process proceeds to step 296.

In step 296, the CPU 100 determines whether or not an end condition which is a condition in which the actual distance measurement process is ended is satisfied. For example, the end condition refers to a condition in which an instruction to end the actual distance measurement process is received through the touch panel 88 and/or a condition in which a predetermined time (for example, one minute) elapses after the determination result in step 290 is negative.

In a case where the end condition is not satisfied in step 296, the determination result is negative, and the process proceeds to step 290. In a case where the end condition is satisfied in step 296, the determination result is positive, and the actual distance measurement process is ended.

Meanwhile, for example, the CPU 100 displays a provisional measurement and provisional imaging guide screen 112 on the display unit 86 as shown in FIG. 14 in step 208 shown in FIG. 8. Thereafter, the process proceeds to step 210. In the actual distance measurement process, the process is performed in any operation mode of a first operation mode in which the provisional measurement and provisional imaging is performed and a second operation mode which is an operation mode other than the first operation mode. In step 208, transition from the second operation to the first operation mode is displayed to the user by displaying the provisional measurement and provisional imaging guide screen 112.

The provisional measurement and provisional imaging guide screen 112 is a screen for guiding the user information indicating that the provisional measurement and the provisional imaging are performed multiple times (for example, three times in the present embodiment) while changing the emission direction of the laser beam. In the example shown in FIG. 14, a message of "please, perform the provisional measurement and provisional imaging three times while changing the emission direction of the laser beam" is displayed on the provisional measurement and provisional imaging guide screen 112.

In step 210, the CPU 100 determines whether or not the provisional measurement and provisional imaging button 90B is turned on. In a case where the provisional measurement and provisional imaging button 90B is not turned on in step 210, the determination result is negative, and the process proceeds to step 212. In a case where the provisional measurement and provisional imaging button 90B is turned on in step 210, the determination result is positive, and the process proceeds to step 214.

In step 212, the CPU 100 determines whether or not the end condition is satisfied. In a case where the end condition is not satisfied in step 212, the determination result is negative, and the process proceeds to step 210. In a case where the end condition is satisfied in step 212, the determination result is positive, and the actual distance measurement process is ended.

In step 214, the CPU 100 performs the provisional measurement by controlling the distance measurement control unit 68. The CPU 100 performs the provisional imaging by controlling the imaging element driver 74 and the image signal processing circuit 76. Thereafter, the process proceeds to step 216.

In step 216, the CPU 100 stores the provisional image which is the image acquired by performing the provisional imaging and the distance acquired by performing the provisional measurement in the primary storage unit 102. Thereafter, the process proceeds to step 218.

In step 218, the CPU 100 determines whether or not the provisional measurement and the provisional imaging are performed three times by determining whether or not the provisional measurement and provisional imaging button 90B is turned three times. In a case where the provisional measurement and the provisional imaging are not performed three times in step 218, the determination result is negative, and the process proceeds to step 210. In a case where the provisional measurement and the provisional imaging are performed three times in step 218, the determination result is positive, and the process proceeds to step 220.

Subsequently, the CPU 100 determines whether or not the relation between a plurality of provisionally measured distances (for example, three distances) is not a predetermined relation satisfying that these distances do not effectively contribute to the construction of the correspondence relation to be described below used in the deriving of the in-actual-image irradiation position. That is, in step 220, the CPU 100 determines whether or not the three distances stored in the primary storage unit 102 in step 216 are effective distances. The effective distances refer to distances having the relation satisfying that the three distances stored in the primary storage unit 102 effectively contribute to the construction (generation) of correspondence information to be described below in the deriving of the in-actual-image irradiation position. For example, the relation satisfying that distances effectively contribute to the construction of the correspondence information to be described below in the deriving of the in-actual-image irradiation position means a relation satisfying that the three distances are separated from each other by a predetermined distance or more (for example, 0.3 meters or more).

In a case where three distances stored in the primary storage unit 102 in step 216 are not effective distances in step 220, the determination result is negative, and the process proceeds to step 222. In a case where the three distances stored in the primary storage unit 102 in step 216 are effective distances in step 220, the determination result is positive, and the process proceeds to step 224.

For example, in step 222, the CPU 100 displays a re-performing guide screen 114 on the display unit 86 as shown in FIG. 15. Thereafter, the process proceeds to step 210.

The re-performing guide screen 114 is a screen for guiding the user the re-performing of the provisional measurement and the provisional imaging. In the example shown in FIG. 15, a message of "effective distances are not able to be measured. Please, perform the provisional measurement and provisional imaging three times while changing the emission direction of the laser beam" is displayed on the re-performing guide screen 114.

In step 224, the CPU 100 specifies the in-provisional-image irradiation position for every provisional image stored in the primary storage unit 102 in step 216. Thereafter, the process proceeds to step 226. For example, the in-provisional-image irradiation position is specified from a difference between the image acquired before the provisional measurement and the provisional imaging are performed (for example, previous frame) in the live view image and the provisional image acquired by performing the provisional imaging. The user can visually recognize the irradiation position of the laser beam from the provisional image in a case where the distance at which the provisional measurement is about several meters. In this case, the irradiation position visually recognized from the provisional image may be designated by the user through the touch panel 88, and the designated position may be specified as the in-provisional-image irradiation position.

In step 226, the CPU 100 generates correspondence information which is an example of the correspondence relation according to the technology of the present disclosure, and stores the generated correspondence information in the secondary storage unit 104 for every parameter changing factor. Thereafter, the process proceeds to step 228 shown in FIG. 10.

The correspondence information refers to information acquired by associating the in-provisional-image irradiation position with the distance of the distances stored in the primary storage unit 102 in step 216 which corresponds to the provisional image related to the in-provisional-image irradiation position for each in-provisional-image irradiation position specified in step 224. The correspondence information is an example of the correspondence relation according to the technology of the present disclosure. The correspondence relation according to the technology of the present disclosure refers to a correspondence relation between the in-provisional-image irradiation position corresponding to the irradiation position of the laser beam onto the subject within the provisional image acquired by performing the provisional imaging on the subject whenever each of the plurality of distances is provisionally measured with the distance which is provisionally measured by the distance measurement unit 12 and the distance measurement control unit 68 by using the laser beam corresponding to the in-provisional-image irradiation position.

That is, the in-provisional-image irradiation position specified by the correspondence information is an example of the "in-provisional-image irradiation position corresponding to the irradiation position of directional light for the subject within the provisional image acquired by performing the provisional imaging on the subject by the imaging unit whenever each of the plurality of distances is provisionally measured" in the correspondence relation according to the technology of the present disclosure. The distance specified by the correspondence information is an example of the "distance which is provisionally measured by the measurement unit (the distance measurement unit 12 and the distance measurement control unit 68) by using the directional light corresponding to the in-provisional-image irradiation position" in the correspondence relation according to the technology of the present disclosure.

For example, in the present embodiment, the correspondence information is stored as a correspondence table 98 in the secondary storage unit 104, as shown in FIG. 11. The correspondence table 98 is updated by storing the generated correspondence information whenever the correspondence information is generated in step 226. In the correspondence table 98, the correspondence information is associated with the parameter changing factor of which the occurrence is determined the in step 200. In the example shown in FIG. 11, the replacement of the lens, the replacement of the distance measurement unit, the change in the angle of view, and the change in the emission direction are used as an example of the parameter changing factor. (1), (2), and (3) shown in FIG. 11 are identification codes for identifying that these factors are parameter changing factors occurring in different timings.

Although three correspondence information items are associated with each of the replacement of the lens, the replacement of the distance measurement unit, and the change in the emission direction in the example shown in FIG. 11, the technology of the present disclosure is not limited thereto. For example, in a case where the parameter changing factor occurs once, the correspondence information items acquired by performing the provisional measurement and the provisional imaging multiple times for the parameter changing factor occurring once are associated with one parameter changing factor. For example, in a case where the provisional measurement and the provisional imaging are performed two times for the parameter changing factor occurring once, two correspondence information items are associated with one parameter changing factor.

In step 228, the CPU 100 determines whether or not the actual measurement and actual imaging button 90A is turned on. In a case where the actual measurement and actual imaging button 90A is turned on in step 228, the determination result is positive, and the process proceeds to step 230. In a case where the actual measurement and actual imaging button 90A is not turned on in step 228, the determination result is negative, and the process proceeds to step 244.

In step 230, the CPU 100 performs the actual measurement by controlling the distance measurement control unit 68. The CPU 100 performs the actual imaging by controlling the imaging element driver 74 and the image signal processing circuit 76. Thereafter, the process proceeds to step 232.

In step 232, the CPU 100 determines whether or not specific correspondence information is stored in the correspondence table 98. The specific correspondence information refers to the correspondence information of the correspondence information items acquired in the past which corresponds to the distance acquired by performing the actual measurement through the process in step 230.

For example, the correspondence information items acquired in the past refer to the correspondence information items which are associated with the corresponding parameter changing factor and are stored in the correspondence table 98. For example, the correspondence information corresponding to the distance acquired by performing the actual measurement refers to the correspondence information associated with a distance matching the distance which is acquired by performing the actual measurement within a predetermined error. For example, the predetermined error is a fixed value of ±0.1 meters, and the technology of the present disclosure is not limited thereto. The predetermined error may be a variable value changed according to an instruction of the user through the touch panel 88.

In a case where the specific correspondence information is not stored in the correspondence table 98 in step 232, the determination result is negative, and the process proceeds to step 234. In a case where the specific correspondence information is stored in the correspondence table 98 in step 232, the determination result is positive, and the process proceeds to step 236.

In step 234, the CPU 100 derives the parameter based on the latest correspondence information of the correspondence information items which are related to the corresponding parameter changing factor and are stored in the correspondence table 98, and associates the derived parameter with the latest correspondence information. Thereafter, the process proceeds to step 238. For example, the "latest correspondence information" refers to the correspondence information generated lately in step 226. The parameter derived in step 234 is an uncertain parameter in a current point of time, and varies for every parameter changing factor as represented in the following Table 1.

TABLE 1

| parameter changing factor | parameter |
| --- | --- |
| replacement of lens | half angle of view α, emission angle β |
| replacement of distance measurement unit | emission angle β, inter-reference-point distance d |
| change in angle of view | half angle of view α |
| change in emission direction | emission angle β |

The number of uncertain parameters may be one to three. For example, in the example shown in Table 1, in a case where both the replacement of the distance measurement unit and the change in the angle of view are performed, the number of uncertain parameters is three such as the half angle of view α, the emission angle β, and the inter-reference-point distance d. In a case where only the replacement of the lens is performed, the number of uncertain parameters is two such as the half angle of view α and the emission angle β. In a case where only the replacement of the distance measurement unit is performed, the number of uncertain parameters is two such as the emission angle β, and the inter-reference-point distance d. In a case where only the change in the angle of view is performed, the number of uncertain parameters is one such as the half angle of view α. In a case where only the change in the emission direction is performed, the number of uncertain parameters is one such as the emission angle β.

For example, the parameters are derived from the following Expressions (2) to (4) in step 234. In Expressions (2) and (3), a distance D is a distance specified from the latest correspondence information, and distances specified from the latest correspondence information are distances $D_1$, $D_2$, and $D_3$ in a case where the latest correspondence information is the correspondence information related to the change in the angle of view (1) in the example shown in FIG. 11. In Expression (4), "row-direction pixels of the irradiation positions" are in-image irradiation positions in a row direction, and "half of the number of row-direction pixels" is half of the number of pixels in the row direction in the imaging element 60. For example, in the present embodiment, the half angle of view α is derived from the following Expression (5). In Expression (5), "f" is a focal length. For example, it is preferable that the focal length f substituted into Expression (5) is a focal length used in the actual imaging of step 230.

[Expression 2]
$$\Delta x = d - D \cos \beta \tag{2}$$

[Expression 3]
$$X = D \sin \beta \tan \alpha \tag{3}$$

[Expression 4]
$$(\text{row-direction pixel of irradiation position}): \tag{4}$$
$$(\text{half of number of row-direction pixels}) = \Delta x : X$$

[Expression 5]
$$\alpha = \operatorname{atan}\left\{\frac{(\text{dimension of imaging pixel})}{2 \times f}\right\} \tag{5}$$

(dimension of imaging pixel)

In step 234, the in-provisional-image irradiation positions specified from the latest correspondence information of the correspondence information items stored in the correspondence table 98 are the "row-direction pixels of the irradiation positions". In the example shown in FIG. 11, in a case where the latest correspondence information is the correspondence information related to the change in the angle of view (1), the in-provisional-image irradiation positions specified from the latest correspondence information are $X_1$, $X_2$, and $X_3$. The distance specified from the latest correspondence information of the correspondence information items stored in the correspondence table 98 are used as the distance D in Expressions (2) and (3) for every corresponding in-provisional-image irradiation position (corresponding "row-direction pixel of the irradiation position"). The parameter closest to each of the "row-direction pixels of the irradiation positions" is derived by the CPU 100.

Now, an example in which a part of the correspondence table 98 shown in FIG. 11 is used in the deriving method of the parameter will be described. For example, in a case where the correspondence information items related to the change in the angle of view (1) and the replacement of the distance measurement unit (1) which are examples of the parameter changing factor are used as the latest correspondence information items, the latest correspondence information items are distances $D_1$, $D_2$, $D_3$, $D_{16}$, $D_{17}$, and $D_{18}$ and the in-provisional-image irradiation positions $X_1$, $X_2$, $X_3$, $X_{16}$, $X_{17}$, and $X_{18}$.

The in-provisional-image irradiation position $X_1$ is used as the "row-direction pixel of the irradiation position" in Expression (4), the distance $D_1$ is used as the distance D in Expressions (2) and (3). The in-provisional-image irradiation position $X_2$ is used as the "row-direction pixel of the irradiation position" in Expression (4), the distance $D_2$ is used as the distance D in Expressions (2) and (3). The in-provisional-image irradiation position $X_3$ is used as the "row-direction pixel of the irradiation position" in Expression (4), the distance $D_3$ is used as the distance D in Expressions (2) and (3). The in-provisional-image irradiation position $X_{16}$ is used as the "row-direction pixel of the irradiation position" in Expression (4), the distance $D_{16}$ is used as the distance D in Expressions (2) and (3). The in-provisional-image irradiation position $X_{17}$ is used as the "row-direction pixel of the irradiation position" in Expression (4), the distance $D_{17}$ is used as the distance D in Expressions (2) and (3). The in-provisional-image irradiation position $X_{18}$ is used as the "row-direction pixel of the irradiation position" in Expression (4), the distance $D_{18}$ is used as the distance D in Expressions (2) and (3). The half angle of view $\alpha$, the emission angle $\beta$, and the inter-reference-point distance d closest to the in-provisional-image irradiation positions $X_1, X_2, X_3, X_{16}, X_{17}$, and $X_{18}$ are derived from Expressions (2) to (4).

In step 236, the CPU 100 derives the parameter based on the specific correspondence information. Thereafter, the process proceeds to step 238. The parameter derived by in step 236 is a parameter associated with the specific correspondence information, and is, for example, a parameter associated with the correspondence information by performing the process of step 234 in the past.

The parameter derived in step 236 may be a parameter associated with the correspondence information by performing the process of step 234 in the past, and the CPU 100 may derive the parameter again by using Expressions (2) to (4) based on the specific correspondence information.

In step 238, the CPU 100 derives the in-actual-image irradiation position based on the parameter derived in step 234 or step 236. Thereafter, the process proceeds to step 240.

For example, the in-actual-image irradiation position is derived from Expressions (2) to (4) in step 238. That is, the parameter derived in step 234 or step 236 is substituted into Expressions (2) to (4), and the distance is substituted as the distance D into Expressions (2) to (4) by performing the actual measurement in step 230. Accordingly, the "row-direction pixel of the irradiation position" is derived as the in-actual-image irradiation position.

Figure 17:
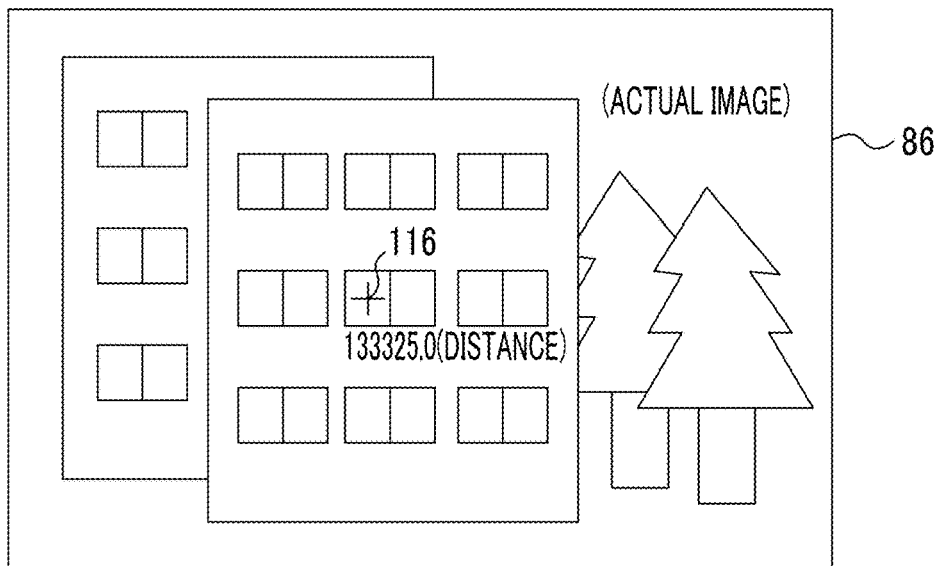
FIG. 17 is a screen diagram showing an example of a screen in a state in which an actual image, a distance, and an irradiation position mark are displayed on a display unit according to the first to third embodiments.

For example, in step 240, the CPU 100 displays the actual image, the distance, and the irradiation position mark 116 on the display unit 86 as shown in FIG. 17. Thereafter, the process proceeds to step 242.

The actual image displayed on the display unit 86 by performing the process of step 240 is an image acquired by performing the actual imaging in step 230.

The distance displayed on the display unit 86 by performing the process of step 240 is a distance acquired by performing the actual measurement in step 230.

The irradiation position mark 116 displayed on the display unit 86 by performing the process of step 240 is a mark indicating the in-actual-image irradiation position derived by performing the process of step 238.

In step 242, the CPU 100 determines whether or not the distance acquired by performing the actual measurement in step 230 is in a correspondence information distance range. A case where the distance acquired by performing the actual measurement in step 230 is not in the correspondence information distance range means that the distance acquired by performing the actual measurement in step 230 is out of the correspondence information distance range.

A case where the distance is in the correspondence information distance range means that the distance is within a range of the distance specified from the correspondence information used in step 234 or step 236. In contrast, a case where the distance is out of the correspondence information distance range means that the distance is not in the range of the distance specified from the correspondence information used in step 234 or step 236. The case where the distance is out of the correspondence information distance range is distinguished between a case where the distance is out of a first correspondence information distance range and a case where the distance is out of a second correspondence information distance range.

Figure 18:
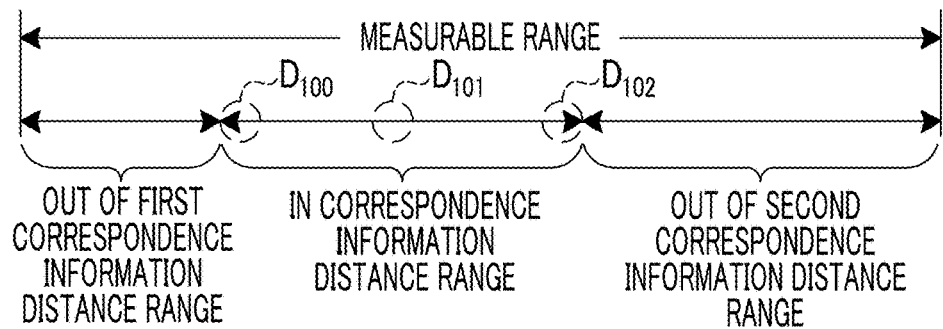
FIG. 18 is a conceptual diagram showing an example in which a distance is in a correspondence information distance range, is out of a first correspondence information distance range, and is out of a second correspondence information distance range according to the first to third embodiments.

For example, in a case where the relation between distances $D_{100}$, $D_{101}$, and $D_{102}$ specified from the correspondence information used in step 234 or step 236 "$D_{100}<D_{101}<D_{102}$" as shown in FIG. 18, the case where the distance is in the correspondence information distance range and the case where the distance is out of the correspondence information distance range are defined as follows.

That is, in the example shown in FIG. 18, the case where the distance is in the correspondence information distance range corresponds to a range of the distance $D_{100}$ or more and the distance $D_{102}$ or less. The case where the distance is out of the first correspondence information distance range corresponds to a range of less than the distance $D_{100}$. The case where the distance is out of the second correspondence information distance range corresponds to a range of more than the distance $D_{102}$.

In a case the distance acquired by performing the actual measurement in step 230 is in the correspondence information distance range in step 242, the determination result is positive, and the process proceeds to step 244. In a case where the distance acquired by performing the actual measurement in step 230 is out of the correspondence information distance range in step 242, the determination result is negative, and the process proceeds to step 246.

Figure 19:
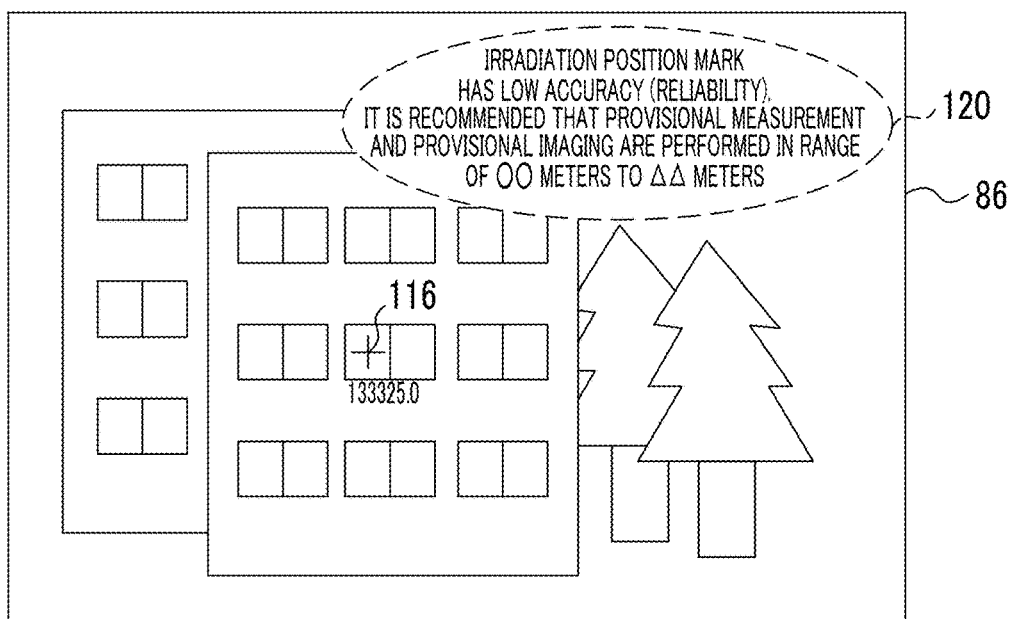
FIG. 19 is a screen diagram showing an example of a screen in a state in which an actual image, a distance, an irradiation position mark, and a warning and recommendation message are displayed on the display unit according to the first to third embodiments.

For example, in step 246, the CPU 100 displays a warning and recommendation message 120 on the display unit 86 such that the alarm and recommendation message is superimposed on the actual image, as shown in FIG. 19. Thereafter, the process proceeds to step 248.

The warning and recommendation message 120 is a message for warning the user that there is a high possibility that the laser beam will not be applied to a position in the real space which corresponds to the position of the irradiation position mark 116 and recommending the provisional measurement and the provisional imaging to the user.

In the example shown in FIG. 19, a warning message of "the irradiation position mark has low accuracy (reliability)" is included in the warning and recommendation message 120. In the example shown in FIG. 19, a recommendation message of "it is recommended that the provisional measurement and the provisional imaging are performed in a range of oo meters to ΔΔ meters" is included in the warning and recommendation message 120.

The "range of oo meters to ΔΔ meters" is a range out of the first correspondence information distance range or a range out of the second correspondence information distance range. That is, in a case where the distance acquired by performing the actual measurement in step 230 is out of the first correspondence information distance range, a default range out of the first correspondence information distance range is employed. In a case where the distance acquired by performing the actual measurement in step 230 is out of the second correspondence information distance range, a default range out of the second correspondence information distance range is employed.

For example, the default range is a range which is uniquely determined from a predetermined table or calculation expression depending on a degree of deviation of the distance acquired by performing the actual measurement in step 230 from a specific value in the correspondence information distance range. The specific value in the correspondence information distance range may be a center value or an average value in the correspondence information distance range. For example, the default range out of the first correspondence information distance range may be a range which is uniquely determined depending on a difference between the distance $D_{100}$ shown in FIG. 18 and the distance acquired by performing the actual measurement in step 230. For example, the default range out of the second correspondence information distance range may be a range which is uniquely determined depending on a difference between the distance $D_{102}$ shown in FIG. 18 and the distance acquired by performing the actual measurement in step 230.

For example, although the warning and recommendation message 120 is presented to the user in step 246 by being visually displayed on the display unit 86, the technology of the present disclosure is not limited thereto. For example, the message may be presented to the user by being output as sound by a sound playback device (not shown) provided at the distance measurement device 10A, or may be displayed through visual display and audible indication.

For example, in step 248, the CPU 100 displays a second intention check screen 118 on the display unit 86 as shown in FIG. 16. Thereafter, the process proceeds to step 250.

The second intention check screen 118 is a screen for checking the user' intention of whether or not to increase the accuracy of the irradiation position of the laser beam, that is, the accuracy of the irradiation position mark 116. In the example shown in FIG. 16, a message of "do you want to increase the accuracy of the irradiation position mark?" is displayed on the second intention check screen 118. In the example shown in FIG. 16, a soft key of "yes" designated for announcing an intention to increase the accuracy of the irradiation position mark 116 is displayed on the second intention check screen 118. In the example shown in FIG. 16, a soft key of "no" designated for announcing an intention not to increase the accuracy of the irradiation position mark 116 is displayed on the second intention check screen 118.

In step 250, the CPU 100 determines whether or not to increase the accuracy of the irradiation position mark 116. In a case where the accuracy of the irradiation position mark 116 is increased in step 250, that is, in a case where the soft key of "yes" of the second intention check screen 118 is pressed through the touch panel 88, the determination result is positive, and the process proceeds to step 208. In a case where the accuracy of the irradiation position mark 116 is not increased in step 250, that is, in a case where the soft key of "no" of the second intention check screen 118 is pressed through the touch panel 88, the determination result is negative, and the process proceeds to step 244.

Meanwhile, in a case where the parameter changing factor does not occur in step 200 shown in FIG. 8, the determination result is negative, and the process proceeds to step 252.

In step 252, the CPU 100 determines whether or not the correspondence information is stored in the correspondence table 98.

In a case where the correspondence information is not stored in the correspondence table 98 in step 252, the determination result is negative, and the process proceeds to step 200. In a case where the correspondence information is stored in the correspondence table 98 in step 252, the determination result is positive, and the process proceeds to step 228.

Figure 10:
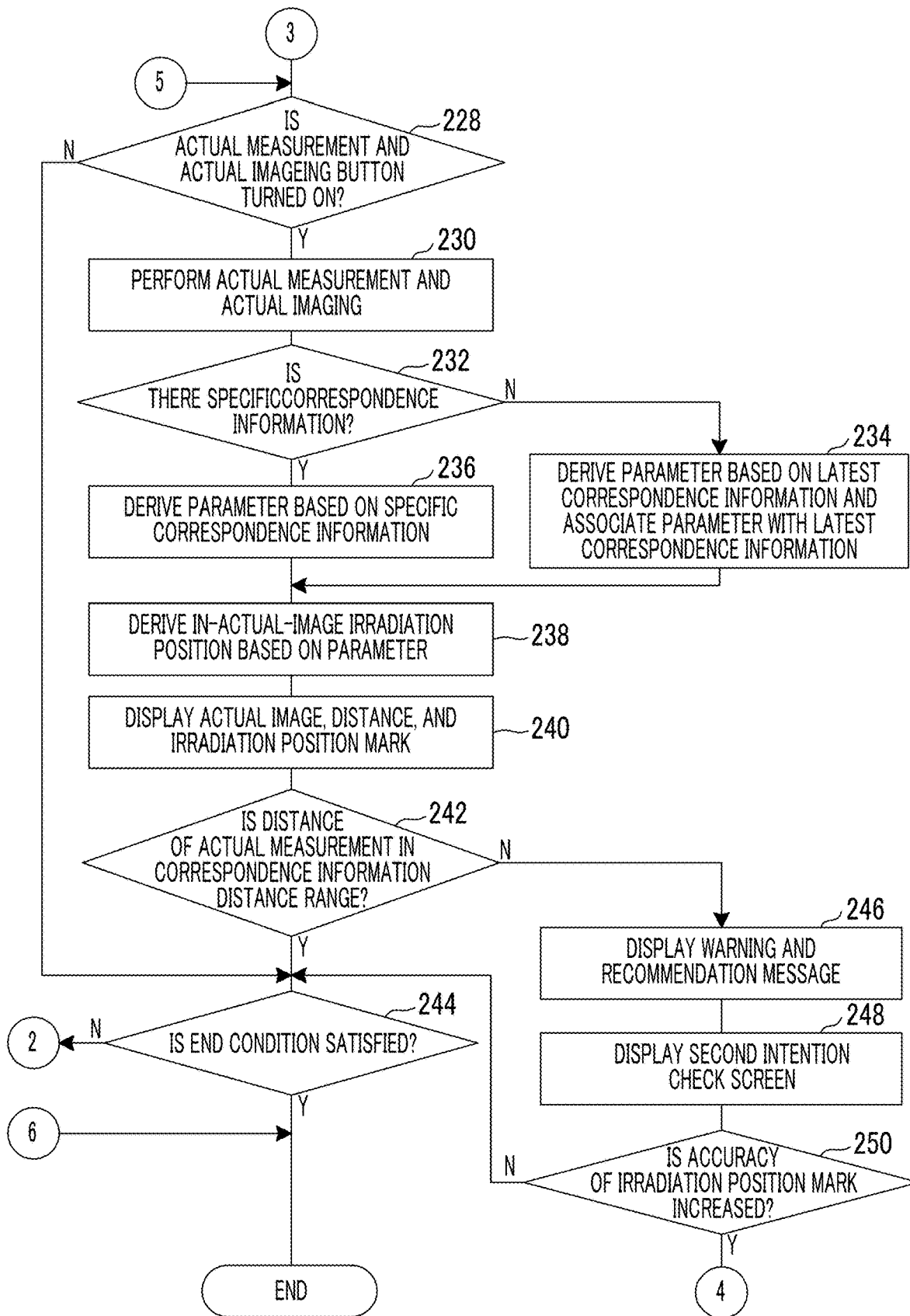
FIG. 10 is a flowchart subsequent to the flowchart shown in FIG. 8.

Meanwhile, the CPU 100 determines whether or not the end condition is satisfied in step 244 shown in FIG. 10. In a case where the end condition is not satisfied in step 244, the determination result is negative, and the process proceeds to step 200. In a case where the end condition is satisfied in step 244, the determination result is positive, and the actual distance measurement process is ended.

As described above, in the distance measurement device 10A, the correspondence information is acquired by associating the in-provisional-image irradiation position within the provisional image acquired by performing the provisional imaging on the subject whenever each of the plurality of distances is provisionally measured with the distance which corresponds to the in-provisional-image irradiation position and is provisionally measured using the laser beam. The in-actual-image irradiation position is derived based on the acquired correspondence information. Therefore, according to the distance measurement device 10A, it is possible to derive the in-image irradiation position with higher accuracy compared to a case where the actual measurement and the actual imaging are performed without performing the provisional measurement and the provisional imaging.

In the distance measurement device 10A, the parameter is derived based on the correspondence information, and the in-actual-image irradiation position is derived based on the derived parameter and the distance acquired through the actual measurement. Therefore, according to the distance measurement device 10A, it is possible to derive the in-image irradiation position with high accuracy compared to a case where the in-actual-image irradiation position is derived without deriving the parameter based on the correspondence information.

In the distance measurement device 10A, the parameter is derived based on the correspondence information. Therefore, according to the distance measurement device 10A, it is possible to derive the parameter with high accuracy compared to a case where the parameter is derived without using the correspondence information.

In the distance measurement device 10A, the parameter includes the half angle of view α, the emission angle β, and the inter-reference-point distance d. Therefore, according to the distance measurement device 10A, it is possible to derive the half angle of view α, the emission angle β, and the inter-reference-point distance d with high accuracy compared to a case where the half angle of view α, the emission angle β, and the inter-reference-point distance d are derived without using the correspondence information.

In the distance measurement device 10A, in a case where the specific correspondence information corresponding to the distance of the correspondence information items acquired in the past which is acquired through the actual measurement is present, the in-actual-image irradiation position is derived based on the specific correspondence information. Therefore, according to the distance measurement device 10A, it is possible to rapidly derive the in-actual-image irradiation position compared to a case where the provisional measurement and the provisional imaging are performed without being omitted in order to derive the in-actual-image irradiation position.

In the distance measurement device 10A, the correspondence information is acquired in a case where the parameter changing factor occurs. Therefore, according to the distance measurement device 10A, it is possible to prevent unnecessary provisional measurement and provisional imaging compared to a case where the correspondence information is acquired even though the parameter changing factor does not occur.

In the distance measurement device 10A, the parameter changing factor includes the replacement of the lens, the replacement of the distance measurement unit, the change in the angle of view, and the change in the emission direction. Therefore, according to the distance measurement device 10A, it is possible to prevent unnecessary provisional measurement and provisional imaging compared to a case where the correspondence information is acquired even though any of the replacement of the lens, the replacement of the distance measurement unit, the change in the angle of view, and the change in the emission direction does not occur.

In the distance measurement device 10A, the re-performing guide screen 114 is displayed in a case where the relation between the plurality of provisionally measured distances is a predetermined relation satisfying that these distances do not effectively contribute to the construction of the correspondence information used in the deriving of the in-actual-image irradiation position. Therefore, according to the distance measurement device 10A, it is possible to prevent a decrease in deriving accuracy of the in-actual-image irradiation position compared to a case where the relation between the plurality of provisionally measured distances is a predetermined relation satisfying that these distances do not effectively contribute to the construction of the correspondence information used in the deriving of the in-actual-image irradiation position.

In the distance measurement device 10A, the distance measurement unit 12 and the lens unit 16 are detachably attached. Therefore, according to the distance measurement device 10A, it is possible to derive the in-actual-image irradiation position with high accuracy even though the distance measurement unit 12 is detachably attached compared to a case where the in-actual-image irradiation position is derived without acquiring the correspondence information even though the distance measurement unit 12 is detachably attached. According to the distance measurement device 10A, it is possible to derive the in-actual-image irradiation position with high accuracy even though the lens unit 16 is detachably attached compared to a case where the in-actual-image irradiation position is derived without acquiring the correspondence information even though the lens unit 16 is detachably attached.

In the distance measurement device 10A, the irradiation position mark 116 which is the mark indicating the derived in-actual-image irradiation position is displayed. Therefore, according to the distance measurement device 10A, the user can easily ascertain the in-actual-image irradiation position compared to a case where the irradiation position mark 116 is not displayed.

Although it has been described in the first embodiment that the warning and recommendation message 120 is displayed, the technology of the present disclosure is not limited thereto. The provisional measurement and the provisional imaging may be forcibly performed without displaying the warning and recommendation message 120. For example, the processes of steps 246, 248, and 250 included in the distance measurement process may be omitted in this case. In the present configuration, it is possible to prevent the irradiation position mark 116 having low accuracy from being presented to the user compared to a case where the provisional measurement and the provisional imaging are arbitrarily performed.

Although it has been described in the first embodiment that the irradiation position mark 116 is displayed even though the distance acquired by performing the actual measurement is out of the correspondence information distance range, the technology of the present disclosure is not limited thereto. For example, in a case where the distance acquired by performing the actual measurement is the distance out of the first correspondence information distance range and a difference between the distance acquired by performing the actual measurement and a minimum distance included in the correspondence information distance range is equal to or greater than a threshold value, the irradiation position mark 116 may not be displayed. For example, in a case where the distance acquired by performing the actual measurement is the distance out of the second correspondence information distance range and a difference between the distance acquired by performing the actual measurement and a maximum distance included in the correspondence information distance range is equal to or greater than the threshold value, the irradiation position mark 116 may not be displayed. In the present configuration, it is possible to prevent the irradiation position mark 116 having low accuracy from being referred to by the user compared to a case where the irradiation position mark 116 is displayed even though the difference between the distance acquired by performing the actual measurement and the distance included in the correspondence information distance range is equal to or greater than the threshold value.

Although it has been described in the first embodiment that the in-actual-image irradiation position is displayed, the technology of the present disclosure is not limited thereto. The parameters derived by performing the processes of step 234 and 236 may also be displayed.

Although it has been described in the first embodiment that since it is assumed that three parameters such as the half angle of view $\alpha$, the emission angle $\beta$, and the inter-reference-point distance d are uncertain parameters, the provisional measurement and the provisional imaging are performed three times, the technology of the present disclosure is not limited thereto. Even though three parameters such as the half angle of view $\alpha$, the emission angle $\beta$, and the inter-reference-point distance d are the uncertain parameters, the provisional measurement and the provisional imaging may be performed four or more times. The greater the number of times the provisional measurement and the provisional imaging are performed, the higher the accuracy. In a case where the uncertain parameters are two, the provisional measurement and the provisional imaging may be performed at least two times, and in a case where the uncertain parameter is one, the provisional measurement and the provisional imaging may be performed at least one time.

Although it has been described in the first embodiment that the replacement of the lens, the replacement of the distance measurement unit, the change in the angle of view, and the change in the emission direction are used as the parameter changing factor, the technology of the present disclosure is not limited thereto. At least one thereof may be used as the parameter changing factor. For example, an event that a predetermined period (for example, 30 days) elapses after the parameter is derived in the previous stage may be used as the parameter changing factor. An event that an absolute value of a change amount of at least one of temperature or humidity exceeds a reference value may be used as the parameter changing factor. An event that a specific constituent member of the distance measurement unit 12 or the imaging device 14 is replaced or an event that the specific constituent member is removed may be used as the parameter changing factor.

A detection unit that detects that the parameter changing factor occurs may be provided in the distance measurement device 10A, or information indicating that the parameter changing factor occurs may be input by the user through the touch panel 88. A detection unit that detects that the plurality of parameter changing factors occurs may be provided in the distance measurement device 10A, or information indicating that the plurality of parameter changing factors occurs may be input by the user through the touch panel 88.

Although it has been described in the first embodiment that the distance measurement control unit 68 is built in the imaging device main body 18, the distance measurement control unit 68 may be provided in not the imaging device main body 18 but the distance measurement unit 12. In this case, the entire distance measurement unit 12 may be controlled by the distance measurement control unit 68 built in the distance measurement unit 12 under the control of the main control unit 62.

Second Embodiment

Although it has been described in the first embodiment that the parameter is derived and the in-actual-image irradiation position is derived based on the derived parameter, it will be described in a second embodiment that the in-actual-image irradiation position is derived without derived the parameter. In the second embodiment, since the same constituent elements as the constituent elements described in the first embodiment will be assigned the same references, the description thereof will be omitted, and only portions different from those of the first embodiment will be described.

A distance measurement device 10B according to the second embodiment is different from the distance measurement device 10A in that a distance measurement program 130 instead of the distance measurement program 106 is stored in the secondary storage unit 104.

Next, a distance measurement process which is realized as of the distance measurement device 10B by performing the distance measurement program 130 in the CPU 100 in a case where a power switch of the distance measurement device 10B is turned on will be described with reference to FIG. 20. The same steps as those of the flowcharts shown in FIGS. 8 to 10 will be assigned the same step numbers, and thus, the description thereof will be omitted.

Figure 20:
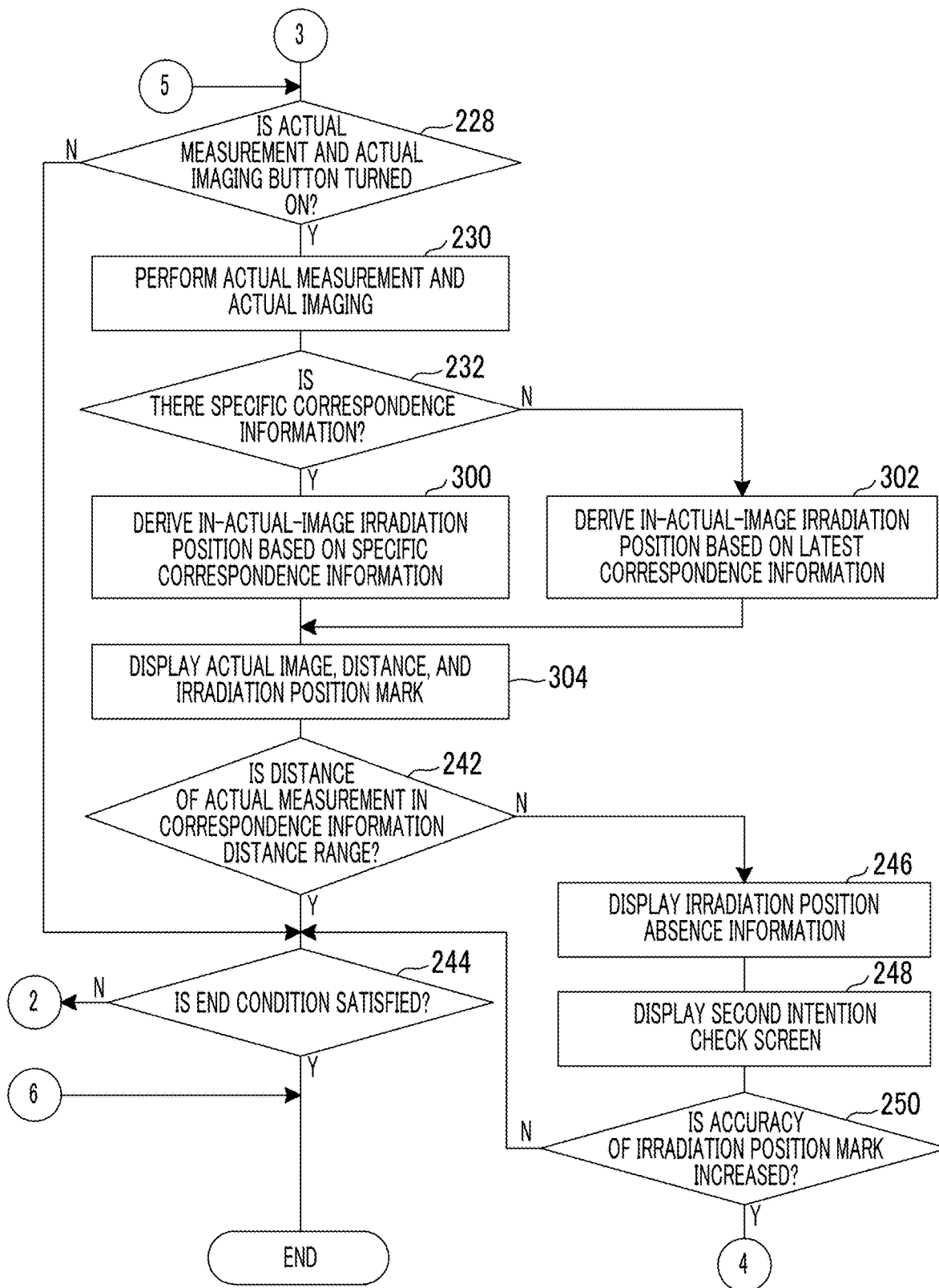
FIG. 20 is a flowchart showing an example of a flow of the distance measurement process according to the second embodiment, and is also a flowchart subsequent to the flowchart shown in FIG. 8.

A flowchart shown in FIG. 20 is different from the flowchart shown in FIG. 10 in that step 302 instead of step 234 is provided and step 300 instead of step 236 is provided. The flowchart shown in FIG. 20 is different from the flowchart shown in FIG. 10 in that step 238 is removed and step 304 instead of step 240 is provided.

In step 300 shown in FIG. 20, the CPU 100 derives the in-actual-image irradiation position based on the specific correspondence information. Thereafter, the process proceeds to step 304.

Figure 21:
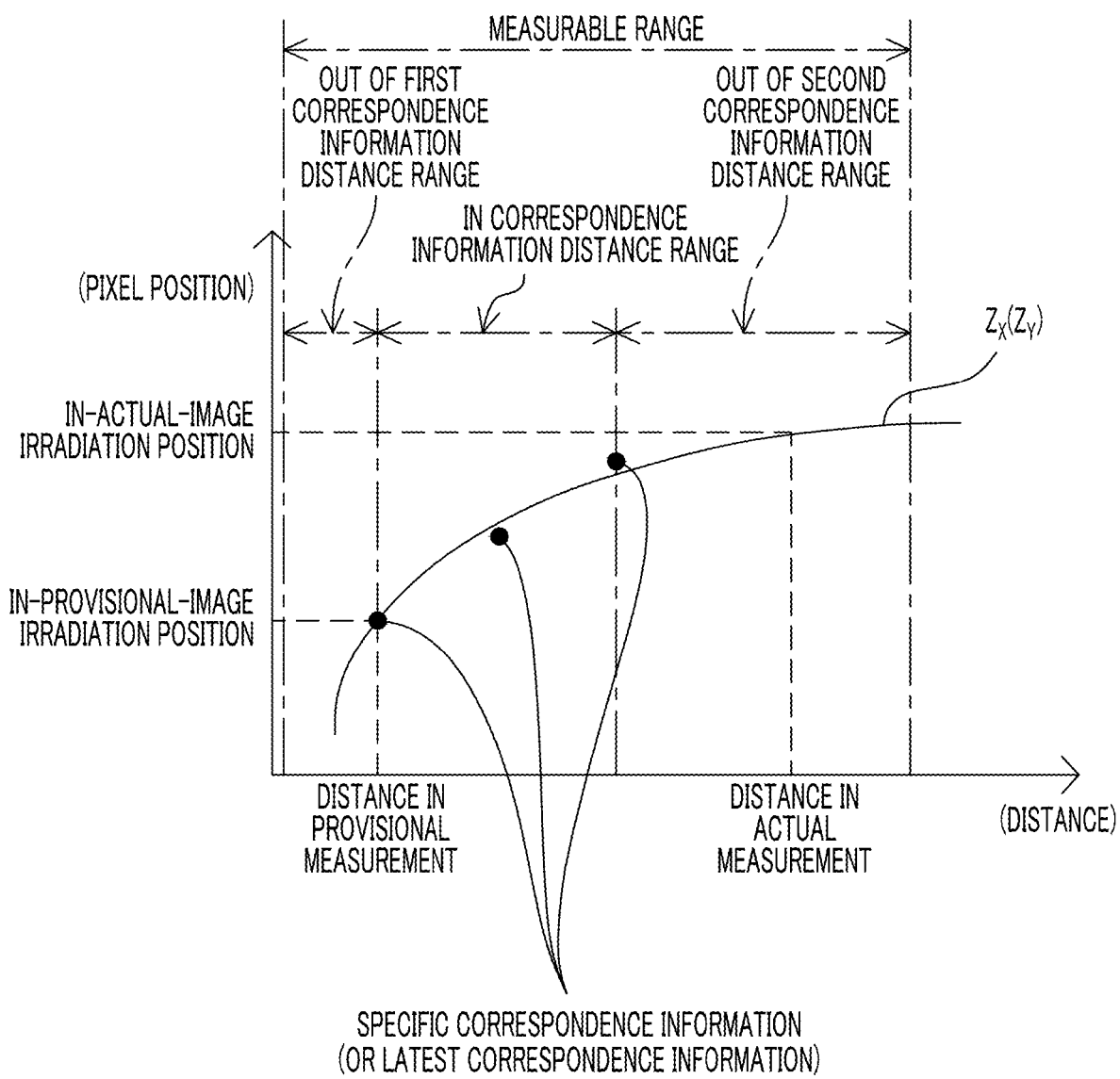
FIG. 21 is a graph showing an example of an approximate curve related to specific correspondence information or latest correspondence information, and is also a graph in which a lateral axis represents a distance and a longitudinal axis represents a position of a pixel.
Figure 22:
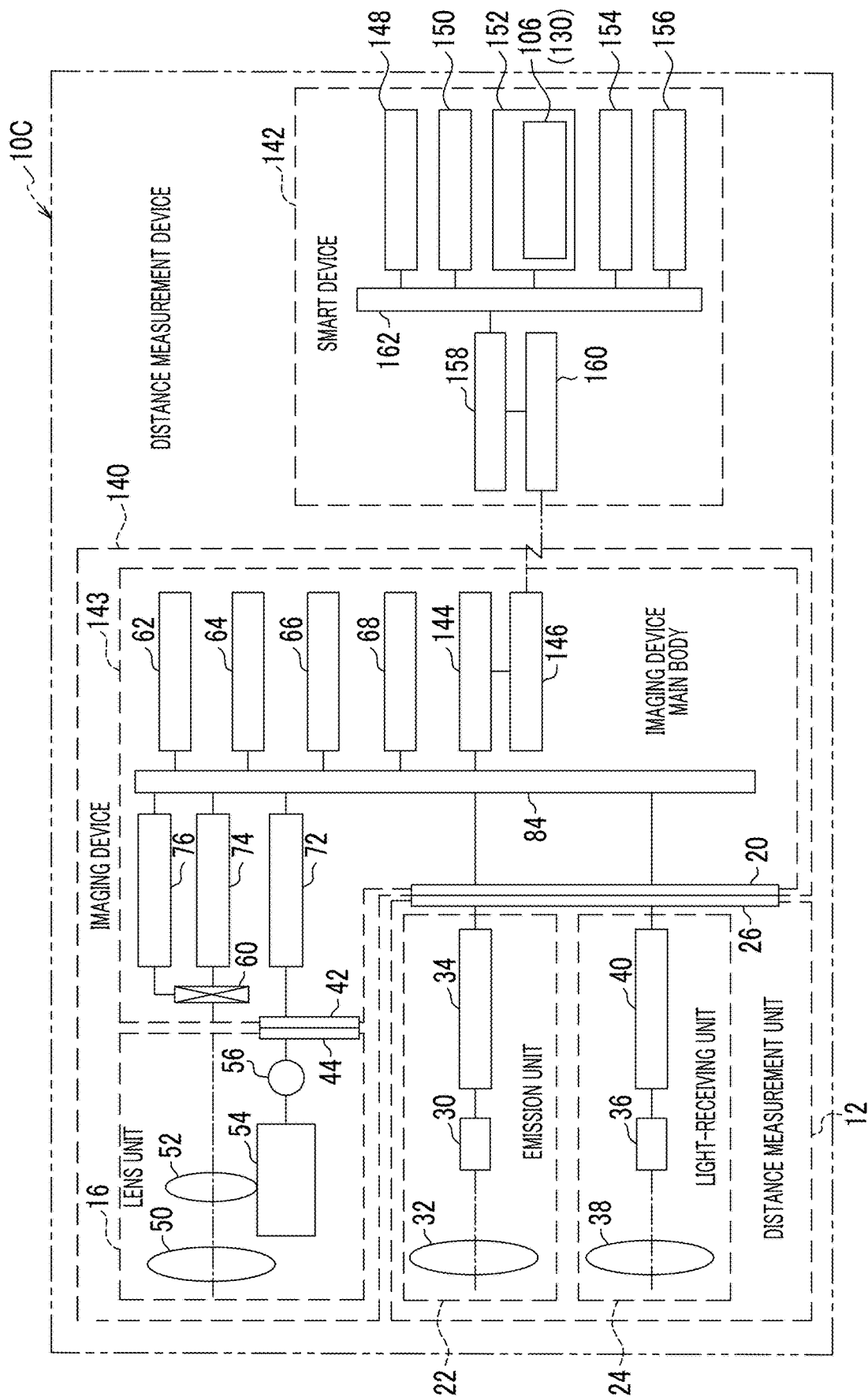
FIG. 22 is a block diagram showing an example of a hardware configuration of main parts of the distance measurement device according to the third embodiment.

For example, in step 300, an approximate curve $Z_x$ is created based on the specific correspondence information, as shown in FIG. 21. The in-actual-image irradiation position corresponding to the distance acquired by performing the actual measurement in step 230 is derived from the approximate curve $Z_x$. That is, in step 300, the in-actual-image irradiation position is derived from the relation between the approximate curve $Z_x$ prescribed by the specific correspondence information (an example of the correspondence relation according to the technology of the present disclosure) and the distance acquired by performing the actual measurement.

In step 302, the CPU 100 derives the in-actual-image irradiation position based on the latest correspondence information. Thereafter, the process proceeds to step 304. That is, in step 302, the in-actual-image irradiation position is derived from the relation between the approximate curve $Z_x$ prescribed by the latest correspondence information (an example of the correspondence relation according to the technology of the present disclosure) and the distance acquired by performing the actual measurement.

For example, in step 302, an approximate curve $Z_y$ is created based on the latest correspondence information as shown in FIG. 21. The in-actual-image irradiation position corresponding to the distance acquired by performing the actual measurement in step 230 is derived from the approximate curve $Z_y$.

Similarly to the first embodiment, a measurable range is distinguished between the case where the distance is in the correspondence information distance range and the case where the distance is out of the correspondence information distance range in the second embodiment. In the second embodiment, the case where the distance is in the correspondence information distance range means that the distance is in a range of the distance specified by the specific correspondence information used in step 300 or the latest correspondence information used in step 302. In contrast, in the second embodiment, the case where the distance is out of the correspondence information distance range means that the distance is out of the distance specified by the specific correspondence information used in step 300 or the latest correspondence information used in step 302. The case where the distance is out of the correspondence information distance range is distinguished between the case where the distance is out of the first correspondence information distance range and the case where the distance is out of the second correspondence information distance range.

For example, in the second embodiment, the case where the distance is out of the first correspondence information distance range means that the distance is in a range which is less than a minimum value of the distance specified by the specific correspondence information or the latest correspondence information. For example, in the second embodiment, the case where the distance is out of the second correspondence information distance range means that the distance exceeds a maximum value of the distance specified by the specific correspondence information or the latest correspondence information.

In the example shown in FIG. 21, a case where the distance acquired by performing the actual measurement in step 230 is out of the second correspondence information distance range is illustrated. Accordingly, as shown in FIG. 21, in a case where the distance acquired by performing the actual measurement in step 230 is out of the second correspondence information distance range, the determination result in step 242 is negative, and the processes subsequent to step 246 are performed by the CPU 100. In a case where the distance acquired by performing the actual measurement in step 230 is in the correspondence information distance range, the determination result in step 242 is positive, and the process of step 244 is performed by the CPU 100.

For example, in step 304, the CPU 100 displays the actual image, the distance, and the irradiation position mark 116 on the display unit 86 as shown in FIG. 17. Thereafter, the process proceeds to step 242.

The irradiation position mark 116 displayed on the display unit 86 by performing the process of step 304 is a mark indicating the in-actual-image irradiation position derived by performing the process of step 300 or step 302.

As described above, in the distance measurement device 10B, the in-actual-image irradiation position is derived from the relation between the approximate curve prescribed by the correspondence information and the distance acquired through the actual measurement. Therefore, according to the distance measurement device 10B, it is possible to derive the in-actual-image irradiation position with a simple configuration compared to a case where the in-actual-image irradiation position is derived without using the approximate curve prescribed by the correspondence information.

Third Embodiment

Although it has been described in the second embodiment that the distance measurement device 10B is realized by the distance measurement unit 12 and the imaging device 14, a distance measurement device 10C realized by the distance measurement unit 12, an imaging device 140, and a smart device 142 in a third embodiment. In the third embodiment, since the same constituent elements as those of the above-described embodiments will be assigned the same references, the description thereof will be omitted, and only portions different from those of the above-described embodiments will be described. Hereinafter, the distance measurement programs are referred to as the "distance measurement program" for the sake of convenience in description in a case where it is not necessary to distinguish between the distance measurement programs 106 and 130.

The distance measurement device 10C according to the third embodiment is different from the distance measurement device 10A according to the first embodiment in that the imaging device 140 instead of the imaging device 14 is provided. The distance measurement device 10C is different from the distance measurement device 10A in that the smart device 142 is provided.

The imaging device 140 is different from the imaging device 14 in that an imaging device main body 143 instead of the imaging device main body 18 is provided.

The imaging device main body 143 is different from the imaging device main body 18 in that a wireless communication unit 144 and a wireless communication antenna 146 are provided.

The wireless communication unit 144 is connected to the busline 84 and the wireless communication antenna 146. The main control unit 62 outputs transmission target information which is information of a target transmitted to the smart device 142 to the wireless communication unit 144.

The wireless communication unit 144 transmits, as a radio wave, the transmission target information input from the main control unit 62 to the smart device 142 through the wireless communication antenna 146. In a case where a radio wave from the smart device 142 is received by the wireless communication antenna 146, the wireless communication unit 144 acquires a signal corresponding to the received radio wave, and outputs the acquired signal to the main control unit 62.

The smart device 142 includes a CPU 148, a primary storage unit 150, and a secondary storage unit 152. The CPU 148, the primary storage unit 150, and the secondary storage unit 152 are connected to a busline 162.

The CPU 148 controls the entire distance measurement device 10C including the smart device 142. The primary storage unit 150 is a volatile memory used as a work area in a case where various programs are executed. A RAM is used as an example of the primary storage unit 150. The secondary storage unit 152 is a non-volatile memory that stores various parameters and/or control programs for controlling the entire operation of the distance measurement device 10C including the smart device 142. A flash memory and/or an EEPROM are used as an example of the secondary storage unit 152.

The smart device 142 includes a display unit 154, a touch panel 156, a wireless communication unit 158, and a wireless communication antenna 160.

The display unit 154 is connected to the busline 162 through a display control unit (not shown), and displays various information items under the control of the display control unit. For example, the display unit 154 is realized by a LCD.

The touch panel 156 is layered on a display screen of the display unit 154, and senses touch using a pointer. The touch panel 156 is connected to the busline 162 through a touch panel I/F (not shown), and outputs positional information indicating a position touched by the pointer. The touch panel I/F activates the touch panel according to an instruction of the CPU 148, and the touch panel I/F outputs the positional information input from the touch panel 156 to the CPU 148.

The soft keys corresponding to the actual measurement and actual imaging button 90A, the provisional measurement and provisional imaging button 90B, the imaging system operation mode switching button 90C, the wide angle instruction button 90D, and the telephoto instruction button 90E described in the first embodiment are displayed on the display unit 154.

Figure 23:
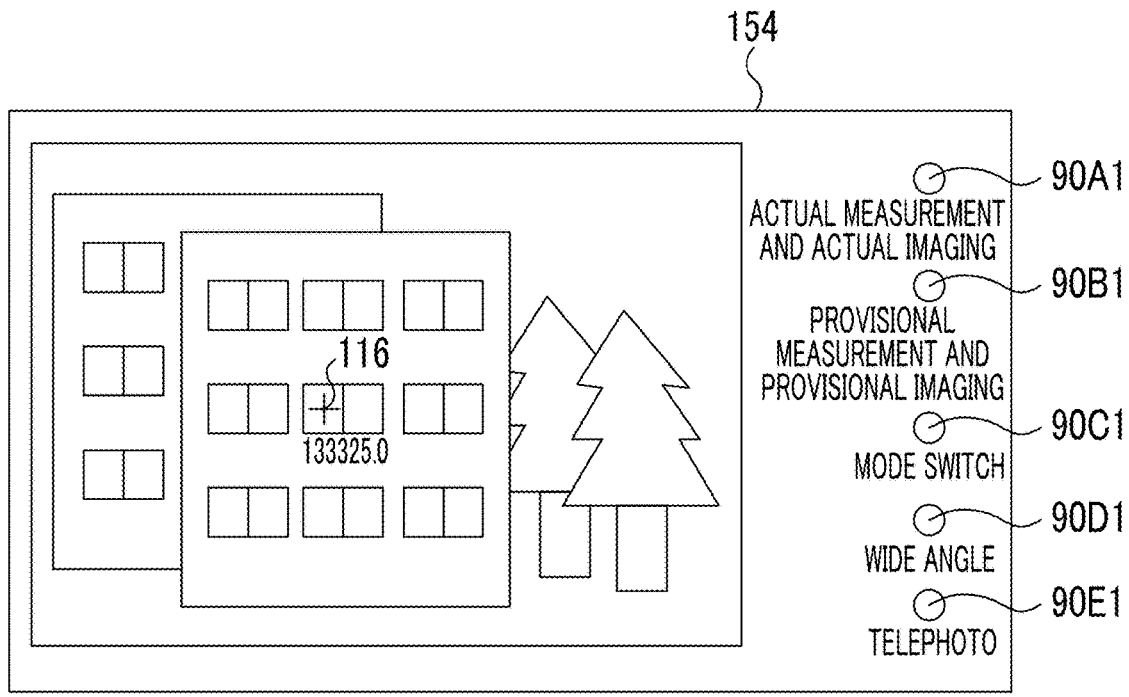
FIG. 23 is a screen diagram showing an example of a screen including an actual measurement and actual imaging button, a provisional measurement and provisional imaging button, an imaging system operation mode switching button, a wide angle instruction button, and a telephoto instruction button displayed as soft keys on a display unit of a smart device according to the third embodiment.

For example, as shown in FIG. 23, an actual measurement and actual imaging button 90A1 functioning as the actual measurement and actual imaging button 90A is displayed as a soft key on the display unit 154, and is pressed by the user through the touch panel 156. For example, a provisional measurement and provisional imaging button 90B1 functioning as the provisional measurement and provisional imaging button 90B is displayed as a soft key on the display unit 154, and is pressed by the user through the touch panel 156. For example, an imaging system operation mode switching button 90C1 functioning as the imaging system operation mode switching button 90C is displayed as a soft key on the display unit 154, and is pressed by the user through the touch panel 156. For example, a wide angle instruction button 90D1 functioning as the wide angle instruction button 90D is displayed as a soft key on the display unit 154, and is pressed by the user through the touch panel 156. For example, a telephoto instruction button 90E1 functioning as the telephoto instruction button 90E is displayed as a soft key on the display unit 154, and is pressed by the user through the touch panel 156.

The wireless communication unit 158 is connected to the busline 162 and the wireless communication antenna 160. The wireless communication unit 158 transmits, as a radio wave, a signal input from the CPU 148 to the imaging device main body 143 through the wireless communication antenna 160. In a case where a radio wave from the imaging device main body 143 is received by the wireless communication antenna 160, the wireless communication unit 158 acquires a signal corresponding to the received radio wave, and outputs the acquired signal to the CPU 148. Accordingly, the imaging device main body 143 is controlled by the smart device 142 by performing wireless communication with the smart device 142.

The secondary storage unit 152 stores a distance measurement program. The CPU 148 is operated as a deriving unit according to the technology of the present disclosure by reading the distance measurement program out of the secondary storage unit 152, loading the readout distance measurement program into the primary storage unit 150, and executing the distance measurement program. For example, the CPU 148 executes the distance measurement program 106, and thus, the distance measurement process described in the first embodiment is realized. The CPU 148 executes the distance measurement program 130, and thus, the distance measurement process described in the second embodiment is realized.

As described above, in the distance measurement device 10C, the correspondence information acquired by associating the in-provisional-image irradiation position with the distance which corresponds to the in-provisional-image irradiation position and is provisionally measured by using the laser beam is acquired by the CPU 148 of the smart device 142 whenever each of the plurality of distances is provisionally measured. The in-actual-image irradiation position is derived based on the acquired correspondence information by the CPU 148 of the smart device 142. Therefore, according to the distance measurement device 10C, it is possible to derive the in-image irradiation position with high accuracy compared to a case where the actual measurement and the actual imaging are performed without performing the provisional measurement and the provisional imaging. According to the distance measurement device 10C, it is possible to reduce a load applied to the imaging device 140 in acquiring the advantages described in the above-described embodiments compared to a case where the distance measurement process is performed by the imaging device 140.

Figure 24:
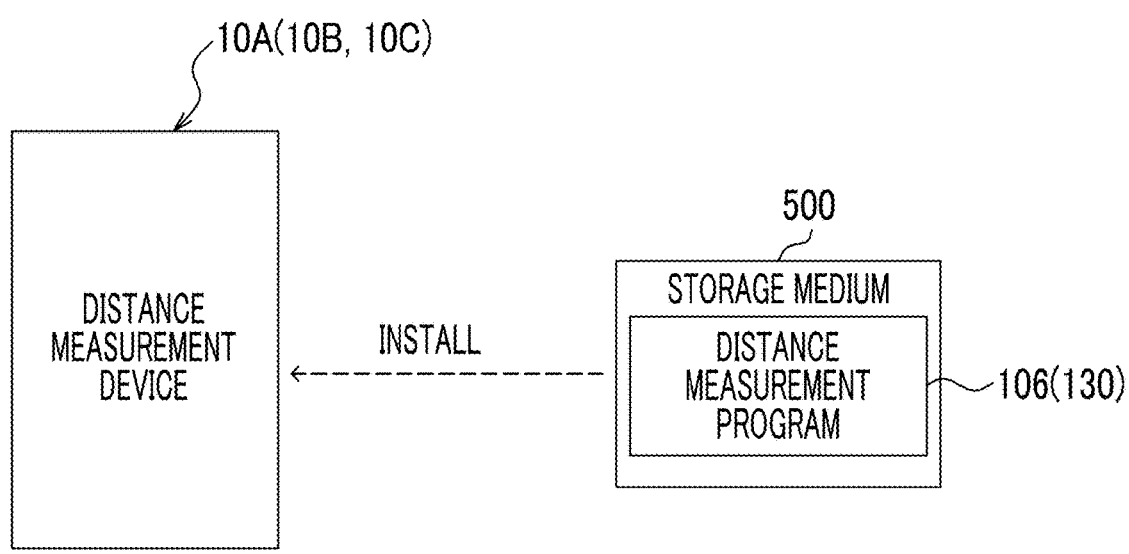
FIG. 24 is a conceptual diagram showing an example of an aspect in which a distance measurement program is installed in the distance measurement device from a storage medium that stores a distance measurement program according to the first to third embodiments.

Although it has been described in the above-described embodiments that the distance measurement program is read out of the secondary storage unit 104 (152), it is not necessary to store the distance measurement program in the secondary storage unit 104 (152) from the beginning. For example, as shown in FIG. 24, the distance measurement program may be stored in an arbitrary portable storage medium 500 such as a solid state drive (SSD) or a universal serial bus (USB) memory. In this case, the distance measurement program stored in the storage medium 500 is installed on the distance measurement device 10A (10B or 10C), and the installed distance measurement program is executed by the CPU 100 (148).

The distance measurement program may be stored in a storage unit of another computer or a server device connected to the distance measurement device 10A (10B or 10C) through a communication network (not shown), or the distance measurement program may be downloaded according to a request of the distance measurement device 10A (10B or 10C). In this case, the downloaded distance measurement program is executed by the CPU 100 (148).

Although it has been described in the above-described embodiments that various information items such as the actual image, the provisional image, the distance, the in-actual-image irradiation position, and the provisional measurement and provisional imaging guide screen 112 are displayed on the display unit 86 (154), the technology of the present disclosure is not limited thereto. For example, various information items may be displayed on a display unit of an external device used while being connected to the distance measurement device 10A (10B or 10C). A personal computer or an eyeglass type or wristwatch type wearable terminal device is used as an example of the external device.

Although it has been described in the above-described embodiments that various information items are visually displayed by the display unit 86 (154), the technology of the present disclosure is not limited thereto. For example, audible indication of an output of sound from a sound playback device may be audibly displayed or a permanent visual display of an output of a printed article from a printer may be performed instead of the visual display. Alternatively, at least two of the visual display, the audible indication, or the permanent visual display may be performed.

Although it has been described in the above-described embodiments that the first intention check screen 110, the provisional measurement and provisional imaging guide screen 112, the re-performing guide screen 114, the irradiation position mark 116, the second intention check screen 118, and the warning and recommendation message 120 are displayed on the display unit 86 (154), the technology of the present disclosure is not limited thereto. For example, the first intention check screen 110, the provisional measurement and provisional imaging guide screen 112, the re-performing guide screen 114, the second intention check screen 118, and the warning and recommendation message 120 may be displayed on a display unit (not shown) different from the display unit 86 (154), and the irradiation position mark 116 may be displayed on the display unit 86 (154). Only the first intention check screen 110, the provisional measurement and provisional imaging guide screen 112, the re-performing guide screen 114, the irradiation position mark 116, the second intention check screen 118, and the warning and recommendation message 120 may be displayed on a display unit different from the display unit 86 (154). The first intention check screen 110, the provisional measurement and provisional imaging guide screen 112, the re-performing guide screen 114, the irradiation position mark 116, the second intention check screen 118, and the warning and recommendation message 120 may be individually displayed on a plurality of display units including the display unit 86 (154).

Although it has been described in the above-described embodiments that the laser beam is used as the light for distance measurement, the technology of the present disclosure is not limited thereto. Directional light which is light having directivity may be used. For example, the measurement light may be directional light acquired by light emitting diode (LED) or a super luminescent diode (SLD). It is preferable that the directivity of the directional light is directivity having the same degree as that of the directivity of the laser beam. For example, it is preferable that the directivity of the directional light is directivity capable of being used in the distance measurement in a range of several meters to several kilometers.

The distance measurement process (for example, see FIGS. 8 to 10) described in the above-described embodiments is merely an example. Accordingly, an unnecessary step may be removed, a new step may be added, or a process procedure may be switched without departing from the gist. The processes included in the distance measurement process may be realized by only the hardware configuration such as ASIC, or may be realized by the combination of the software configuration and the hardware configuration using the computer.

The disclosures of Japanese Patent Application No. 2015-171419 filed on Aug. 31, 2015 are hereby incorporated by reference in their entireties.

All documents, patent applications, and technical standards described in the present specification are herein incorporated by reference to the same extent as if such individual document, patent application, and technical standard were specifically and individually indicated to be herein incorporated by reference.

The above-described embodiments are further disclosed in the following appendices.

Appendix 1

A distance measurement device comprises an imaging unit that images a subject, a measurement unit that measures a distance to the subject by emitting directional light which is light having directivity to the subject and receiving reflection light of the directional light, and a deriving unit that acquires a correspondence relation between an in-provisional-image irradiation position, which corresponds to an irradiation position of the directional light onto the subject, within a provisional image acquired by provisionally imaging the subject by the imaging unit whenever each of a plurality of distances is provisionally measured by the measurement unit and a distance which is provisionally measured by the measurement unit by using the directional light corresponding to the in-provisional-image irradiation position, and derives specific information for specifying a positional relation between the imaging unit and the measurement unit based on the acquired correspondence relation.

Appendix 2

In the distance measurement device according to Appendix 1, the specific information includes a parameter that influences the irradiation position.

Appendix 3

In the distance measurement device according to Appendix 1 or 2, in a case where a factor for changing a parameter that influences the irradiation position occurs, the deriving unit acquires the correspondence relation.

Appendix 4

In the distance measurement device according to Appendix 3, a factor is at least one of replacement of a lens of the imaging unit, replacement of the measurement unit, a change in angle of view (angle of view on a subject image) on a subject captured by the imaging unit, or a change in direction in which the directional light is emitted.

Appendix 5

The distance measurement device according to any one of Appendices 1 to 4 further comprises a display unit that displays a result derived by the deriving unit.

Appendix 6

A distance measurement device comprises an imaging unit that images a subject image indicating a subject, a measurement unit that measures a distance to the subject by emitting directional light which is light having directivity to the subject and receiving reflection light of the directional light, and a deriving unit that acquires a correspondence relation between an in-provisional-image irradiation position, which corresponds to an irradiation position of the directional light onto the subject, within a provisional image acquired by provisionally imaging the subject image by the imaging unit whenever each of a plurality of distances is provisionally measured by the measurement unit and a distance which is provisionally measured by the measurement unit by using the directional light corresponding to the in-provisional-image irradiation position, and derives an in-actual-image irradiation position, which corresponds to an irradiation position of the directional light used in actual measurement performed by the measurement unit, within an actual image acquired by performing actual imaging by the imaging unit, based on the acquired correspondence relation.

Appendix 7

A distance measurement device comprises an imaging unit that images a subject image indicating a subject, a measurement unit that measures a distance to the subject by emitting directional light which is light having directivity to the subject and receiving reflection light of the directional light, and a deriving unit that acquires a correspondence relation between an in-provisional-image irradiation position, which corresponds to an irradiation position of the directional light onto the subject, within a provisional image acquired by provisionally imaging the subject image by the imaging unit whenever each of a plurality of distances is provisionally measured by the measurement unit and a distance which is provisionally measured by the measurement unit by using the directional light corresponding to the in-provisional-image irradiation position, and derives specific information for specifying a positional relation between the imaging unit and the measurement unit based on the acquired correspondence relation.

What is claimed is:

1. A distance measurement device comprising:
an image sensor that images a two-dimensional image of a subject;
a display displaying the two-dimensional image of the subject imaged by the image sensor;
an emitter emitting a light to the subject;
a light receiver receiving a reflection light of the light; and
a processor configured to perform a measurement and a dimension deriving function,
wherein the measurement derives only a single distance to a single irradiation position on the subject corresponding to a single pixel out of all pixels of the two-dimensional image by using the emitter and the light receiver,
wherein the dimension deriving function derives a length as a dimension,
wherein the dimension is a dimension in a real space corresponding to two points designated on the display displaying the two-dimensional image of the subject, and
wherein the dimension deriving function derives the length by using the single distance and the two points.

2. The distance measurement device according to claim 1, wherein the dimension deriving function derives the length by using the single distance and addresses of pixels of the image sensor which correspond to the two points.

3. The distance measurement device according to claim 2, wherein the dimension deriving function derives the length by using a pitch between the pixels corresponding to the two points.

4. The distance measurement device according to claim 1,
wherein the processor is further configured to perform a provisional measurement,
wherein a provisional measurement derives a plurality of provisional distances to subjects, and
wherein the measurement derives the single distance to the subject by using the provisional distances.

5. The distance measurement device according to claim 4, wherein a guide message relating to the change of the measurement position is displayed, in a case in which the processor performs the provisional measurement.

6. The distance measurement device according to claim 4, wherein the measurement uses a correspondence relation generated by using the provisional distances, and
wherein the correspondence relation includes at least measurement positions and the provisional distances corresponding to the measurement positions, and
wherein the processor is further configured to continue performing a plurality of the measurements without performing the provisional measurement, after the correspondence relation is generated.

7. The distance measurement device according to claim 4, wherein the processor is further configured to display a guide message relating to a change of a measurement position of the provisional measurement, in case of performing the provisional measurement.

8. The distance measurement device according to claim 4, wherein the processor is further configured to determine whether or not the provisional distances are effective distances, and
wherein the processor is further configured to end the provisional measurement in a case in which the plurality of provisional distances are determined to be the effective distances.

9. The distance measurement device according to claim 1, wherein the processor is further configured to display a measurement position mark of the measurement on the display in a case in which the single distance is appropriate, and not to display the measurement position mark on the display, in a case in which the single distance is inappropriate.

10. The distance measurement device according to claim 4, wherein the processor is further configured to display a guide message relating to the provisional measurement on the display, in a case in which a factor influencing to the measurement occurs.

11. The distance measurement device according to claim 1, further comprising a memory recording an image file which includes the two-dimensional image of the subject and distance measurement information associated with the two-dimensional image,
wherein the distance measurement information includes at least one of distance information to the subject and dimension information relating to the dimension corresponding to the two points.

12. The distance measurement device according to claim 11, wherein the processor is further configured to read out the image file from the memory, and
wherein the processor is further configured to display the two-dimensional image and the distance measurement information on the display by reading out the image file.

13. The distance measurement device according to claim 1, wherein the processor is further configured to display a value of the single distance together with a measurement position mark of the measurement on the display.

14. The distance measurement device according to claim 1, wherein the light is a directional light.

15. The distance measurement device according to claim 1, wherein the processor is further configured to display a guide message relating to the single distance derived by the measurement or a guide message relating to a change of a measurement position on the display, in a case in which the single distance is inappropriate.

16. The distance measurement device according to claim 15, wherein the processor is further configured to display a guide message relating to the single distance derived by the measurement on the display, in a case in which the single distance is inappropriate.

17. The distance measurement device according to claim 15, wherein the processor is further configured to display a guide message relating to a change of a measurement position on the display, in a case in which the single distance is inappropriate.

18. The distance measurement device according to claim 16, wherein the processor is further configured to display a guide message relating to a change of a measurement position on the display, in a case in which the single distance is inappropriate.

19. The distance measurement device according to claim 1, wherein the measurement using the emitter unit and the light receiver is performed independently of the two-dimensional image acquisition by the image sensor.

* * * * *